(12) United States Patent
Kolter et al.

(10) Patent No.: US 11,676,025 B2
(45) Date of Patent: *Jun. 13, 2023

(54) METHOD, APPARATUS AND COMPUTER PROGRAM FOR GENERATING ROBUST AUTOMATIC LEARNING SYSTEMS AND TESTING TRAINED AUTOMATIC LEARNING SYSTEMS

(71) Applicants: Robert Bosch GmbH, Stuttgart (DE); Carnegie Mellon University, Pittsburgh, PA (US)

(72) Inventors: Jeremy Zico Kolter, Pittsburgh, PA (US); Eric Wong, Lexington, MA (US); Frank R. Schmidt, Stuttgart (DE); Jan Hendrik Metzen, Boeblingen (DE)

(73) Assignees: Robert Bosch GmbH, Stuttgart (DE); Carnegie Mellon University, Pittsburgh, PA (US)

( * ) Notice: Subject to any disclaimer, the term of this patent is extended or adjusted under 35 U.S.C. 154(b) by 1263 days.

This patent is subject to a terminal disclaimer.

(21) Appl. No.: 16/173,126

(22) Filed: Oct. 29, 2018

(65) Prior Publication Data
US 2020/0026996 A1  Jan. 23, 2020

Related U.S. Application Data

(60) Provisional application No. 62/736,858, filed on Sep. 26, 2018, provisional application No. 62/677,896, filed on May 30, 2018.

(51) Int. Cl.
*G06N 3/084* (2023.01)
*G06N 20/00* (2019.01)
(Continued)

(52) U.S. Cl.
CPC ............. *G06N 3/084* (2013.01); *G06N 3/045* (2023.01); *G06N 3/048* (2023.01); *G06N 20/00* (2019.01); *G06N 3/088* (2013.01)

(58) Field of Classification Search
CPC ....... G06N 3/084; G06N 20/00; G06N 3/0454
See application file for complete search history.

(56) References Cited

U.S. PATENT DOCUMENTS

2011/0307438 A1* 12/2011 Fernández Martínez ....................
G01V 99/005
706/52
2014/0081893 A1* 3/2014 Modha ...................... G06N 3/04
706/26

OTHER PUBLICATIONS

Li et al., "Nonlinear Estimators and Tail Bounds for Dimension Reduction in I1 Using Cauchy Random Projections," 2007, Journal of Machine Learning Research 8, pp. 2497-2532 (Year: 2007).*

(Continued)

*Primary Examiner* — Abdullah Al Kawsar
*Assistant Examiner* — Asher H. Jablon
(74) *Attorney, Agent, or Firm* — Maginot, Moore & Beck LLP

(57) ABSTRACT

A method for training an automated learning system includes processing training input with a first neural network and processing the output of the first neural network with a second neural network. The input layer of the second neural network corresponding to the output layer of the first neural network. The output layer of the second neural network corresponding to the input layer of the first neural network. An objective function is determined using the output of the second neural network and a predetermined modification magnitude. The objective function is approximated using random Cauchy projections which are propagated through the second neural network.

12 Claims, 19 Drawing Sheets

(51) Int. Cl.
*G06N 3/045* (2023.01)
*G06N 3/048* (2023.01)
*G06N 3/088* (2023.01)

(56) References Cited

OTHER PUBLICATIONS

Livni et al., "A Simple Geometric Interpretation of SVM using Stochastic Adversaries", 2012, In Proceedings of the 15th International Conference on Artificial Intelligence and Statistics (AISTATS), pp. 722-730 (Year: 2012).*
O'Shea et al. "An Introduction to Convolutional Neural Networks", 2015, arXiv:1511.08458v2 [cs.NE], 11 pages (Year: 2015).*
Fawzi et al., "Analysis of classifiers' robustness to adversarial perturbations", 2016, arXiv:1502.02590v4, 19 pages (Year: 2016).*
Papernot et al., "Distillation as a Defense to Adversarial Perturbations against Deep Neural Networks", 2016, In 2016 IEEE Symposium on Security and Privacy, pp. 582-597 (Year: 2016).*
Radford et al., "Unsupervised Representation Learning with Deep Convolutional Generative Adversarial Networks", 2016, arXiv:1511.06434v2 [cs.LG], 16 pages (Year: 2016).*
Neyshabur et al., "Stabilizing GAN Training with Multiple Random Projections", 2017, arXiv:1705.07831v1, 17 pages (Year: 2017).*
Maeda et al., "FPGA Implementation of a Pulse Density Neural Network Using Simultaneous Perturbation", 2000, In Proceedings of the IEEE-INNS-ENNS International Joint Conference on Neural Networks—IJCNN 2000, pp. 296-301 (Year: 2000).*
Eric Wong et al: "Provable defenses against adversarial examples via the convex outer adversarial polytope", arxiv.org, Cornell University, Ithaca, NY 14853, Nov. 2, 2017, arXiv:1711.00851v1.

* cited by examiner

METHOD, APPARATUS AND COMPUTER PROGRAM FOR GENERATING ROBUST AUTOMATIC LEARNING SYSTEMS AND TESTING TRAINED AUTOMATIC LEARNING SYSTEMS

CROSS-REFERENCE TO RELATED APPLICATIONS

This application claims the benefit of U.S. Provisional Application No. 62/677,896 filed May 30, 2018, entitled "SCALING PROVABLE ADVERSARIAL DEFENSES," and benefit of U.S. Provisional Application No. 62/736,858 filed Sep. 26, 2018, entitled "METHODS AND SYSTEMS FOR SCALABLE, PROVABLE ADVERSARIAL DEFENSES IN NEURAL NETWORKS, the entire disclosures of which are hereby incorporated herein by reference.

TECHNICAL FIELD

This disclosure relates generally to the field of neural network classifiers and, more specifically, to systems and methods for training deep neural network classifiers with provable robustness to inputs that include norm-bounded adversarial perturbations.

BACKGROUND

Unless otherwise indicated herein, the materials described in this section are not prior art to the claims in this application and are not admitted to the prior art by inclusion in this section.

Neural network classifiers are used in a wide range of machine learning applications to enable computerized systems to recognize elements in unstructured sets of input data. In one non-limiting example, a neural network classifier receives a digital photograph as an input and generates a classification output that identifies one or more objects in the photograph. In an example of one specific application, automated facial recognition systems use neural networks to identify a person in a population of people based on a photograph that includes the person's face. Such applications are used in many fields, including biometric authentication. Other uses of image classification include machine vision for robotics applications and, in particular, the operation of autonomous vehicles that recognize two-dimensional and three-dimensional image inputs from a wide range of sensors including cameras and LIDAR/RADAR sensors to recognize and track objects that are located around the autonomous vehicle. One type of neural network that is commonly used for these classification operations is a deep convolutional neural network (DCNN).

While neural network classifiers are effective in classifying images and other inputs as described above, existing neural network classifiers may fail to properly classify certain inputs that include accidental or intentional perturbations, and norm-bounded perturbations in particular. A norm-bounded perturbation refers to a modification that is made to an input to a neural network classifier that prevents the neural network classifier from generating a correct classification for the modified input even if the classifier would correctly classify the original input. For example, one type of perturbation includes modifying selected pixels in an input image to prevent the neural network from generating the proper classification of the image. Of course, arbitrary changes to any input can change the input so much that any classifier would produce a different output. A norm-bounded perturbation is a specific type of modification in which the change to the input data is small enough that the modified input data stays within a predetermined boundary of the original input data so that the modified input does not appear to be substantially different than the original input. The term "norm" is known in mathematics as a function that assigns a strictly positive length or size to each vector in a vector space, where the allowed perturbations are all bounded by an upper vector length bound so that the modified input remains similar to the original input.

In one practical example of norm-bounded perturbation, an adversary intentionally modifies the pixels in a photograph of a face using a norm-bounded perturbation of the original pixels to produce a modified output image, although in some instances the perturbation could be caused by a random error or other non-intentional modification of the original image. The modified photograph appears to be identical or at least similar to the original photograph when viewed by a human being, and would not appear to be suspicious to an ordinary human observer. However, a neural network classifier that correctly classifies the original photograph does not correctly classify the modified photograph, and the norm-bounded perturbations defeat the neural network classifier.

Prior art attempts to improve neural network classifiers to properly classify inputs that include norm-bounded perturbations exist, but the prior-art solutions have drawbacks for practical implementation in complex neural networks, which include deep convolutional neural networks that are commonly used for classification operations. One prior art strategy takes the original training data for a neural network and applies norm-bounded perturbations to the original training data, which produces a larger set of training data that includes the norm-bounded perturbations. However, these methods greatly increase the size of the training data set, which slows the training process for the neural network, and while these techniques may reduce the number of possible perturbations to input that produce an incorrect classification, they do not guarantee that all perturbations within a predetermined norm-bound will be correctly classified. Other techniques seek to verify the ability of a neural network to properly classify inputs that have been modified with norm-bounded perturbations in a formal manner that proves if the neural network can or cannot properly classify all inputs with the norm-bounded perturbations, but these techniques do not independently generate neural networks that are robust to all norm-bounded perturbations, since these techniques only verify previously trained neural networks. Finally, some prior art techniques seek to integrate a verification process into the training process of the neural network in order to adjust the training process so that the trained neural network is provably robust to all of the norm-bounded perturbations. However, these training techniques do not scale well to larger deep convolutional neural networks that have multiple convolutional layers. Additionally, some types of neural networks such as residual neural networks (ResNETs) include connections not only between layers in a direct series, but also from earlier layers to later layers that skip one or more intervening layers (e.g. between layer 2 and layer 5, skipping layers 3-4 in one possible configuration) that cannot be handled effectively using the prior art training techniques.

As described above, neural network classifiers can be susceptible to norm-bounded perturbations that modify inputs to produce incorrect classifications, and while some prior art techniques attempt to address this problem, the prior art techniques also have deficiencies. Consequently, improvements to training processes for neural networks that provide provable robustness to norm-bounded perturbations in input data while being scalable to practical neural network implementations would be beneficial.

SUMMARY

Advantages of the Present Disclosure

Nowadays, autonomous driving can be based on cameras, which sense the environment of an autonomous car. Intelligent image processing comprising neural networks processes images of such a camera in order to control the autonomous car dependent on the sensed images. However, it is possible that the intelligent image processing, in particular the neural networks, is fooled by a perturbed image. The perturbation can be an adversarial modification of the image such as described above in the prior art section. The perturbation image can fool the neural network although the modified image does not differ from the originally depicted scene for the human eye. Therefore, neural networks are highly vulnerable to adversarial attacks. A possible defense is to retrain neural network with additionally generated adversarial modifications of the respective training images. This is disadvantageous as it is time-consuming and costly to generate modifications of the image that could fool the neural network and there is a high probability that modifications remain which are not covered by crafting adversarial examples, but which can still fool the neural network. In particular, with this approach, it is not possible to provide a robustness of the neural network against all possible adversarial perturbations of input images.

The present disclosure proposes a method for determining whether a neural network is provably robust against perturbations such as adversarial perturbations. Consequently, the present disclosure allows designing classifiers that are guaranteed to be robust to adversarial perturbations, even if the attacker is given full knowledge of the classifier. This guaranty holds over the whole space of possible adversarial examples of an input.

DISCLOSURE OF THE PRESENT DISCLOSURE

According to a first aspect of the disclosure, a method for testing an automated learning system is disclosed. It is tested whether the automated learning system is robust against modification less than or equal to a given magnitude. This implies that all arbitrary and/or possible modifications considering the magnitude constraint, do not change an output value of the automated learning system to a given target output value. Furthermore, it can be tested whether at least a modification of a test input value of the automated learning system changes the output value of the automated learning system corresponding to, preferably equal to, a given target output value.

The output value of the automated learning system corresponding to the target output value one can understand that the output value is equal to the target output value or the output value has its maximum at the same range or position as the target output value.

The test input value that is subject to the small modification causes the automated learning system to output the target output value when it is fed into automated learning system and propagated through the automated learning system. The modification of the test input value is less than or equal to a given modification magnitude. In particular, the modification is a small modification if, and only if, a size of the modification is less than or equal to a predetermined modification magnitude. The automated learning system comprises at least an input layer that receives the test input value and an output layer that outputs the output value of the automated learning system. The output value of the automated learning system may characterize a classification of the test input value into at least one of several classes.

The method for testing an automated learning system comprises the following steps:

Determining a second, preferably a superposed, output value dependent on the target output value and dependent on an output value that is assigned to the test input value and that may characterize a true classification of the test input value, in particular a label, which is assigned to the test input value. The superposed output value may characterize a superposed classification and may characterize a second classification.

It is proposed that the second output value is a superposed output value and wherein it is determined depending on either one of a difference between the output value and the target output value or a difference between the determined output value of the automated learning system and the target output value.

Providing a second automated learning system based on the automated learning system. The second automated learning system has the same layers, in particular same architecture, in particular the same connected layers in a reverse order, as the automated learning system. Each layer of the second automated learning system corresponds to, preferably exactly, one corresponding layer of the automated learning system.

The output layer of the second automated learning system corresponds to the input layer of the automated learning system, i.e. an output to the second automated learning system is outputted by the output layer of said second automated learning system, and said output layer corresponds to the input layer of the automated learning system. The input layer of the second automated learning system corresponds to the output layer of the automated learning system, i.e. an input to the second automated learning system is fed into the input layer of said second automated learning system, and said input layer corresponds to the output layer of the automated learning system.

Propagating the second output value through the second automated learning system.

Determining dependent on the output value that results from the propagation of the second output value through the second automated learning system, dependent on the modification magnitude, and dependent on the test input value whether the modification results in the output value of the automated learning system corresponding to the target output value.

The advantage of this aspect is that a robustness of the automated learning system can be efficiently determined due to the reusage of the automated learning system as a second automated learning system.

If the automated learning system does not determine the target output value and determines the correct output value, the automated learning system is robust against each possible modification with respect to the limitation that said modifications are less than or equal to the given magnitude. The target output values can be chosen dependent on the different aspects of the present disclosure. In the first aspect, the given target output value is different from the labeled output value corresponding to the test input value. In the second aspect, the output value is different from the output value determined by the automated learning system depending on the test input value.

Preferably, the automated learning system comprises hidden layers, which are connected with each other by providing an output value as an input value for at least one of the hidden layers. The input layer can be connected with at least one of the hidden layers. The output layer receives at least one output value of the hidden layers and/or the output of the input layer as input.

Wherein the hidden layers of the second automated learning system are ordered in reverse order to the hidden layers of the automated learning system; i.e. each hidden layer of the automated learning system provides, at its output, an intermediate value that is passed on to an input of a subsequent hidden layer, and the layer of the second automated learning system that corresponds to the subsequent hidden layer provides, at its output, an intermediate value that is passed on to a layer of the second automated learning system that corresponds to said hidden layer. In other words, a signal that is fed into the input layer of the second automated learning system is propagated through a series of corresponding layers in reverse order to the layers of the automated learning system.

The magnitude characterizes an intensity or strength of the modification of the input value. The magnitude can be a value characterizing the modification. An example of the modification can be an adversarial perturbation. The modification can be measured by determining a norm value of the modification. Preferably, the modification is measured relative to the original input value without a modification.

The architecture of the automated learning system can be described by the layers and preferably, by the way the layers are arranged and connected with each other. The same architecture therefore means that the second automated learning system comprises the same arrangement of the layers similar to the automated learning system.

The automated learning system can be computer-implemented, for example as a (deep-) neural network or a convolutional neural network or a recurrent neural network or a CapsuleNetwork or a support vector machine, or a Gaussian Process.

It is proposed to utilize the automated learning system for a machine learning system. The machine learning system can be an intelligent machine like a robot, which learns to solve a predefined task, for example by exploring its environment and learning from feedback by its environment or from given feedback.

It is proposed to determine an objective function depending on the output value of the second automated learning system and depending on the modification magnitude and depending on the test input value. Then, the determined objective function is compared to a predetermined threshold. It is determined whether a small modification to the test input value does not cause the output value of said test input value to correspond to the target output value depending on the result of said comparison. If the determined objective function exceeds the predetermined threshold, it is determined that the small modification does not cause the output value of said test input value to correspond to the target output value.

Advantageously, a trained automated learning system is tested. Under trained automated learning system one can understand that the automated learning system is able to solve a given task, and the way to solve is self-learned by the automated learning system, in particular is captured in a parametrization of the automated learning system. Typically, automated learning systems learn complex relationships within the data, such as sensor values, and utilize the learned relationships to solve the given task. A trained automated learning system for classification is advantageously parametrized after a training procedure such that preferably a complete training data set is correctly classified according to the assigned classes to the training input values. However, the training procedure should be terminated after a given criterion is reached in order not to memorize the training data set.

In an alternative embodiment, the method according to the first aspect can be used to approval of an automated learning system.

The automated learning system can be a classifier. The automated learning system, in particular the classifier is configured to determine an output value, which characterizes a classification of the input value into at least one of several classes. In another embodiment, the automated learning system is configured to carry out a segmentation or a regression.

The term classification can be broadly understood. Classification can be that the automated learning system assigns to each input value of the automated learning system at least a class, wherein the class characterizes a property and/or a feature and/or an object of the input value. Segmentation can be seen as a special kind of classification, wherein for segmentation at least some of the elements of the input value are assigned to at least one class, also a semantic region can be assigned to at least one of the several classes. Image captioning and object recognition/detection can also be seen as a special kind of classification. The term regression means that the input value of the automated learning system is to be continued in a proper way by the automated learning system.

The input values of the automated learning system that is configured to carry out a classification or a regression are not limited to the given examples, they can be chosen as desired. The output values of the automated learning system that is configured to carry out a classification or a regression can characterize a classification or a regression of the corresponding input values of the automated learning system.

It is proposed to issue a robustness certificate when the modification does not result in the output value of the automated learning system corresponding to the target output value.

Note that the robustness certificate can also be generated after carrying out the other aspects of the present disclosure.

According to a second aspect of the disclosure, a method for detecting a modification, in particular an adversarial example, of a test input value that results in an output value determined by the automated learning system corresponding to a target output value, is disclosed. The target output value may differ from the determined output value of the automated learning system.

The second aspect can be utilized for detecting whether a test input value to the automated learning system may have been modified with a small modification, particularly an adversarial example of a test input value, such that an output value of said test input value, i.e. the output value that the automated learning system outputs when said test input value is fed into and propagated through the automated learning system, results in an output value that corresponds to a target output value.

For the different aspects of the disclosure, it is proposed to determine an objective function dependent on the output value of the second automated learning system and dependent on the modification magnitude and dependent on the test input value.

The objective function characterizes a guaranteed lower bound on the solution of determining whether the modification changes the output value to the target output value.

According to a third aspect of the disclosure, a method is disclosed for determining the largest possible modification magnitude of a modification to a test input value that does not cause a change of the corresponding output value to a target output value. The output value is that value that is outputted by the automated learning system when the test input value, particularly that is subjected to the modification, is fed into and propagated through the automated learning system.

This aspect is advantageous as the strongest modification magnitude without e.g. to misclassify the input into a false class can be determined, so that provably the output of the automated learning system cannot be flipped by the modified input value to the target output value.

It is proposed to determine several different second output values respectively for several different target output values that are respectively different from the determined output values or different from the output value that is assigned to the test input value. Said second output values are propagated through the automated learning system, which outputs a plurality of corresponding output values, wherein the objective function is determined depending on said plurality of corresponding output values, i.e. on all output values of said plurality of corresponding output values.

This has the advantage that guaranteed no modification of the input value within the given modification magnitude will fool the automated learning system, because no other class is provable determined by the automated learning system caused by the modification of the input value.

According to a fourth aspect of the disclosure, a method for training an automated learning system is disclosed. The method comprises the following steps:

Providing a given modification magnitude and training data, which comprise training input values and corresponding training output values. The training output values may characterize the true/labeled classification of the respective input values.

Providing a second automated learning system based on the automated learning.

Determining for each training input value a corresponding second output value dependent on a target output value and dependent on an output value that corresponds to the respective training input value, i.e. the output value that is outputted by the automated learning system when the respective training input value is fed into and propagated through the automated learning system.

Feeding as input value of the second automated learning system the second output values and propagating the second output values through the second automated learning system.

Determining at least an objective function dependent on the given modification magnitude and dependent on at least one of the training input values and dependent on at least one of the output values of the second automated learning system determined by propagating the second output value corresponding to said at least one of the respective training input value.

Determining a loss function, which is dependent on the determined objective function and dependent on at least the training output value corresponding to the respective training input value, which was utilized to determine the objective function.

Adjusting parameters of the automated learning system in order to optimize, in particular minimize, the loss functions with regard to a given optimization criterion.

A loss function measures or characterizes a difference, in particular by a mathematical distance measurement, between two values. The loss function can be either a: cross-entropy loss, hinge loss or zero-one loss. Advantageously, the optimization is done over a sum of loss functions, wherein each loss function is determined on at least one objective function.

It is proposed that according to the fourth aspect, the method further comprises the steps of: Determining a largest modification magnitude of the trained automated learning system with the method according to the third aspect of the disclosure. Continuing training of the trained automated learning system if said largest safe modification magnitude is less than a predetermined second threshold. This may include the step of resetting the values of some or all of the trained parameters of the automated learning system before continuing training.

For each aspect, it is proposed that each transformation of the layers is characterized by a respective function. The second transformation is characterized by a second function, which is related to a conjugate of the function, in particular a Fenchel conjugate function.

A function can map the input value of the respective layer on the corresponding output value or associates an input value set with the corresponding output value set according to the transformation, respectively. The function can be defined by some parameters.

For each aspect, it is proposed that an indicator function is defined for each layer of the automated learning system, wherein, for each layer, the corresponding indicator function is set to zero if the input of said layer is (directly) connected to exactly one further layer of the automated learning system. If not, the indicator function may be chosen equal to a value that is interpreted as "infinity", wherein the second function is determined depending on said indicator function. Preferably, it is an approximation of a conjugate function of the indicator function.

Note that if no skip connections are used, the related conjugate function is the exact conjugate function of the indicator function.

For each aspect, it is proposed that the objective function is determined dependent on a first term, which characterizes a product of the output of the second automated learning system multiplied by the input value of the automated learning system, and a second term, which characterizes a given norm of the output value of the second automated learning system weighted by the modification magnitude.

Note that when the modification magnitude of the modification of the input value of the automated learning system is determined by a first norm (e.g. $l_p$-norm), then the given norm is a dual norm (e.g. $l_q$-norm) of the first norm. The dual norm is defined as: $1/p+1/q=1$.

For each aspect, it is proposed that one of the layers is connected with at least two other layers and receives the output value of the connected layers as its input value. For each aspect, it is proposed that, at least one of the transformations is characterized by a non-linear function, in particular a rectified linear function (so-called ReLu function). For each aspect, it is proposed that at least one of the transformations is partly a linear transformation characterized by a parameter.

For each aspect, it is proposed that the input value of at least the layer, whose transformation is characterized by the non-linear function, has a limited allowable set of input values that is characterized by an upper and a lower bound.

This has the advantage that the values are bounded resulting in a more accurate objective function.

For each aspect, it is proposed that the automated learning system comprises a batch normalization layer. The transformation of the batch normalization layer is characterized by a shift of a mean and variance of the input value dependent on a given mean and given variance.

Note that preferably the given mean and given variance are given individually for each element of the input value.

For each aspect, it is proposed that the limited allowable set of input values is further limited to input values fulfilling a linear inequality.

The set of input value is thereby further limited. Thereby, a more accurate objective function can be determined. Furthermore, the parameters capture dependencies of the bounds and produce tighter bounds around the allowable set of values and consequently the bounds of an adversarial polytope at the output of the automated learning system, improved performance, in particular for large automated learning system with lots of layers. In addition, the bounds of the activation functions are tighter resulting in a smaller error and a training resulting in a more robust automated learning system can be achieved.

For each aspect, it is proposed that one of the parameters is a matrix comprising the upper and lower bounds of a previous connected layer.

For each aspect, it is proposed that the threshold for the objective function is not less than zero, and preferably not greater than a predetermined positive bias.

The bias characterizes a tolerance or safety margin of the decision, e.g. whether the automated learning system is robust or not against an adversarial example. Thereby, the reliability of the objective function is increased.

For the fourth aspect, it is proposed that the layers are grouped and the grouped layers are trained separately from each other.

This has the advantage that the impact of the modification magnitude in the objective function is reduced. Later, the whole cascade can be trained.

A physical actuator of a technical system can be controlled dependent on an output value of the automated learning system, in particular according to each aspect of the present disclosure. In the case that the automated learning system has been tested according to the first aspect of the present disclosure, the physical actuator can be at least collaterally or immediately controlled by the output value of the automated learning system. Moreover, the input value of the automated learning system can be tested according to the second aspect whether it is an adversarial example. If it is decided that the input value is not an adversarial example, then the physical actuator can be controlled dependent on the output value of the automated learning system, otherwise the output value of the automated learning system can be discharged rejected. The physical actuator can be a part of the technical system. The technical system can be for example an at least partly autonomous machine, robot, vehicle, mechanical tool, factory, or flying object, such as a drone. The physical actor may be a part of an engine or a brake.

It is proposed to have a computer-implemented method, wherein at least a processor carries out the steps of the methods of the different aspects of the present disclosure. The automated learning system can also be implemented in hardware or a hybrid of hardware and software.

In another embodiment, the output value of the automated learning system can be used to determine control signal or control command. The control signal or the control command can be used to control the physical actuator. The physical actuator may be controlled corresponding to the control signal or the control command. In another embodiment, a control unit controls the physical actuator. The control unit can be configured to determine the control signal or the control command dependent on the output of the automated learning system. It is also possible that the control unit directly or indirectly controls the physical actuator dependent on the output value of the automated learning system.

The input values of the automated learning system can be received from sensor or can be received externally via the Internet or another data transmitting system or communication system.

In a further aspect of the present disclosure, a computer program is proposed, which is configured to carry out any of the previous mentioned aspects of the present disclosure. The computer program comprises commands which—when executed on a computer—cause said computer to carry out the methods with all of its steps of the different aspects of the present disclosure. Furthermore, a computer readable storage is proposed on which the computer program is stored. Furthermore, an apparatus is proposed which is configured to carry out the methods of the present disclosure.

In another aspect of the present disclosure, a product is proposed that is obtained by carrying out one of the methods of the first to fourth aspect of the present disclosure.

DETAILED DESCRIPTION

Figure 1:
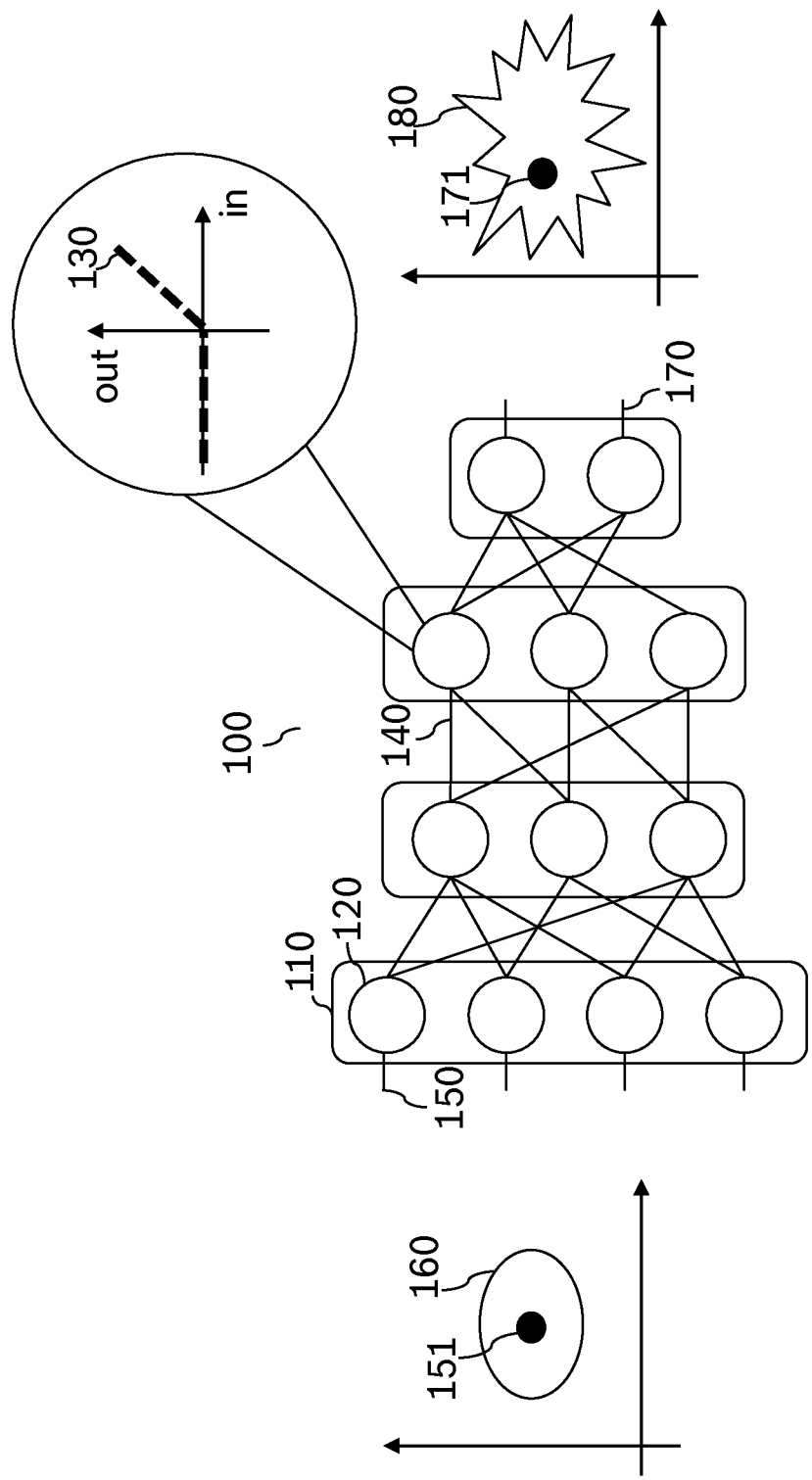
FIG. 1 shows a schematic depiction of a neural network with an input value and possible perturbations of the input value as well as an output value with an adversarial polytope.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

FIG. 1 shows a schematic depiction of an embodiment of an automated learning system as a neural network 100. The neural network 100 comprises several layers 110. Each layer 110 comprises neurons 120, which have an input 150 and an output. The input value received at the input 150 of the neuron 120 is called activation of the neuron 120.

The neurons 120 determine dependent on their activation an output value. Further, the neurons comprise an activation function 130 that is utilized to determine the output value dependent on the activation of the respective neuron 120. The depicted activation function 130 in FIG. 1 is a rectified linear unit (ReLu) activation function.

The layers of the neural network 100 are (directly) connected with each other by connections 140. The connections 140 connect an output of the neuron of a first connected layer with an input of the neuron corresponding to a second connected layer and provide the output value as an input value to the connected neuron of the second connected layer. Preferably, the connections 140 multiply the output value by parameter and provide the multiplied output value as input value. One of the layers 110 is an input layer of the neural network 100. The input layer receives as input value an input value 151 of the neural network 100. The neural network 100 comprises further an output layer. The provided output value at output 170 of the output layer is an output value 171 of the neural network 100.

As depicted in FIG. 1, the layers 110 can be arranged in a row, wherein the layers are connected with a subsequent layer, respectively. The neural network 100 may comprise a batch normalization layer and/or a max-pooling layer and/or a linear-pooling layer.

The input value 151 of the neural network 100 can be a scalar, vector, matrix or tensor. For example, the input value can be a picture or audio signal or a sensor value. The output value 171 can be vector in this embodiment, which characterizes for example a classification of the input value into one of several classes. In this embodiment, each output 170 of the output layer characterizes one of the classes. The activations can be either a scalar, vector, matrix or a tensor dependent on the dimensions of the corresponding layers 110.

Considering k layers, the neural network $f_\theta$ is given by the equations:

$$z_i = \sum_{j=1}^{i-1} f_{i,j}(z_j), \text{ for } i = 2, \ldots, k \quad (1)$$

with the input value of the neural network $z_1 = x$ and $f_\theta(x) = z_k$ and a function $f_{i,j}$ from layer j to layer i and parametrization $\theta$.

As shown in FIG. 1, the input value 151 of the neural network 100 can vary within a given scope (input perturbation 160). For example, due to measurement noise, the input value can vary, which can be characterized by a perturbation value $\epsilon$. The input value can also vary due to an adversarial modification of the input value. The modification can be locally limited, e.g. only a semantic region of an input image is modified, which is also characterized by the perturbation value $\epsilon$. The perturbation value $\epsilon$ can be a maximal value of the modification or a mean of the modification.

The maximum perturbation is depicted schematically in FIG. 1 by the bounded input perturbation 160. The bounded input perturbation 160 can be mathematically described as:

$$B(x) = \{x + \Delta : \|\Delta\|_p \leq \epsilon\} \quad (2)$$

where B(x) represents an input constraint for the maximum allowable input perturbation 160 and $(\|\Delta\|_p)$ characterizes a p-norm-bounded modification $\Delta$ of the input value x. The modification $\Delta$ can be for example noise or an adversarial perturbation of the input value x, wherein the modification $\Delta$ describes all possible modifications due to e.g. noise or adversarial examples of the input value x. The perturbation $\epsilon$ can be seen as an upper bound of the modification $\Delta$ of the input value (x).

In order to decide whether there exists a modification $\Delta$ of the input value x within B(x) which can fool the neural network 100, following optimization problem has to be solved:

$$\min_{z_k} c^T z_k \quad (3)$$
$$\text{subject to } z_i = \sum_{j=1}^{i-1} f_{i,j}(z_j), \text{ for } i = 2, \ldots, k$$
$$z_1 \in B(x)$$

where the input value x has assigned a given class $y^* = y^{true}$ and a target class $y^{targ}$ and $c = e_{y^*} - e_{y^{targ}}$. The target class $y^{targ}$ can be arbitrarily chosen and is a class different from the given class $y^*$. The result of the equation (3) is a scalar describing the most adversarial input value (x) within B(x), that is classified by the neural network as the target class $y^{targ}$, although the input value x belongs to the given class $y^{true}$. If this scalar is positive then there does not exist an adversarial example of the input value x, which fools the neural network due to a misclassification of the adversarial example. If the scalar is positive, then there exists a guaranteed robustness against all modifications within B(x).

The optimization problem according to equation (3) can be solved for all different target classes different from the given class $y^{true}$. If the result of the optimization problem according to equation (3) is positive for all target classes different from the given class, then there does not exist a norm bounded adversarial modification Δ of the input value x that could be misclassified by the neural network 100. The important point is that, if the minimum of equation (3) is positive, it is guaranteed that no adversarial examples exist within B(x).

Because it is very inefficient to solve the optimization problem according to equation (3), the problem can be bounded, in particular, by a dual optimization problem. In mathematical optimization theory, duality or the duality principle is the principle that optimization problems may be viewed from either of two perspectives, the primal problem or the dual problem. Note that a solution of the dual problem is a feasible dual solution and provides a guaranteed lower bound on the solution of the primal optimization problem as given in equation (3).

The dual problem can be built by adding the constraints into the primal optimization problem, e.g. with Lagrangian multipliers. The method of Lagrange multipliers is a strategy for finding the local maxima and minima of a function subject to equality constraints (i.e., subject to the condition that one or more equations have to be satisfied exactly by the chosen values of the variables).

For the case, when skip connection are used, the constraints of the equation (3) are dependent on each other. Therefore, an indicator function is used to determine the dual optimization problem. The indicator function of an event is a random variable that takes a first value, e.g., 1, when the event happens and second value, e.g., 0, when the event does not happen. Indicator functions are often used in probability theory to simplify notation and to prove theorems. The indicator function here can be given as:

$$\chi_i(z_{1:i}) = \begin{cases} 0, & \text{if } z_i = \sum_{j=1}^{i-1} f_{i,j}(z_j) \\ \infty, & \text{otherwise} \end{cases} \quad (4)$$

for i=2, ..., k.

A 'pseudo'-conjugate function, related to a Fenchel conjugate function, of the indicator function is given by:

$$\chi_i^*(z_{1:i}) = \max_{z_i} -v_i^T z_i + \sum_{j=i+1}^{k} v_j^T f_{i,j}(z_i) \quad (5)$$

for i=1, ..., k−1. Note that the conjungate function of equation (5) is not an exact conjugate function of equation (4), therefore $\chi_i^*$ is called a 'pseudo'-conjugate function.

The 'pseudo'-conjugate of the indicator function can be upper bounded by:

$$\chi_i^*(z_{1:i}) \leq h_i(v_{i:k}) \quad (6)$$

$$\text{subject to } v_i = \sum_{j=i+1}^{k} g_{i,j}(v_j)$$

With previous equations, the optimization problem according to equation (3) can be rewritten as a lower bound of equation (3). This lower bound is expressed by:

$$\max_v \left( -\sum_{i=2}^{k} h_i(v_{i:k}) - \hat{v}_1^T x - \epsilon \|\hat{v}_1\|_q \right) \quad (7)$$

subject to $v_k = -c$ $$v_i = \sum_{j=i}^{k-1} g_{i,j}(v_{j+1}), \text{ for } i = 1, \ldots, k-1$$

where $\| \|_q$ is the dual norm to the p-norm in equation (2).

The max-term can be written as an objective function J:

$$J(x, v_{1:k}) = -\sum_{i=2}^{k} h_i(v_{i:k}) - v_1^T x - \epsilon \|v_1\|_* \quad (8)$$

The objective function J can be efficiently determined by using a dual neural network that is given by the following equation based on equation (7):

$$v_k = -c \quad (9)$$

$$v_i = \sum_{j=i}^{k-1} g_{i,j}(v_{j+1}), \text{ for } i = 1, \ldots, k-1$$

where $g_{i,j}$ is the dual layer, characterizing a dual transformation by a dual activation function of said layer.

In the following, two different dual layers are shown exemplarily. The dual layer for a linear layer ($z_{i+1} = W_i z_i + b_i$) can be expressed as:

$$\chi_i^*(z_{1:i}) = v_{i+1}^T b_i$$

subject to $v_i = W_i^T v_{i+1}$ \quad (10)

Figure 4:
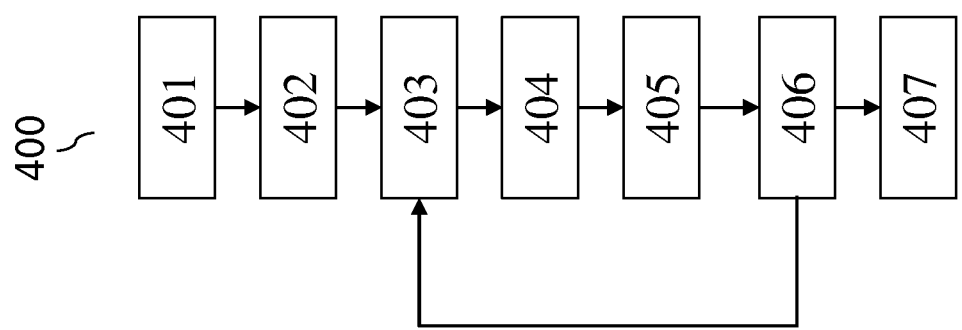
FIG. 4 shows schematically an embodiment of a flow chart of a method for determining upper and lower bounds of activation functions and shows a schematic depiction of the neural network with a skip connection.
Figure 4:
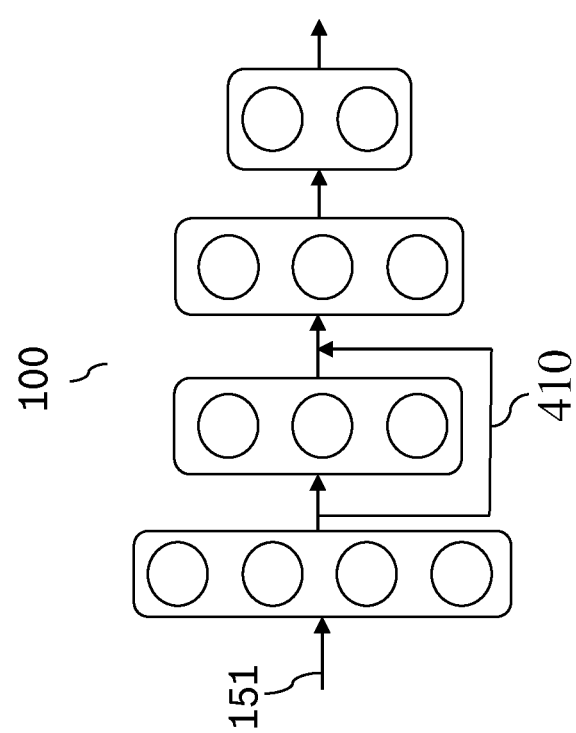

The dual layer for the layer with the ReLu activation function ($z_{i+1} = \max\{z_i, 0\}$) is given as:

$$\chi_i^*(z_{1:i}) \leq -\sum_{j \in I_i} l_{i,j} \times \max[v_{i,j}, 0] \quad (11)$$

subject to $v_i = D_i v_{i+1}$ where $D_i$ is a diagonal matrix:

$$(D_i)_{jj} = \begin{cases} 0 & j \in I_i^- \\ 1 & j \in I_i^+ \\ \frac{u_{i,j}}{u_{i,j} - l_{i,j}} & j \in I_i \end{cases} \quad (12)$$

and $I_i^-$, $I_i^+$, $I_i$ denotes a set of the negative, positive and spanning zero activations, respectively. These sets of activations are dependent on lower and upper bounds (u, l) of the corresponding activations and can be seen as auxiliary constraints. If the upper bound (u) of the activation is smaller than zero, the activation corresponds to the set of activations $I_i^-$ with negative activations. If the lower bound (l) is positive, then the activation corresponds to the set of activations $I_i^+$ with positive activations. If the lower and upper bound span the zero point, then the activation corresponds to the set $I_i$. The method to determine the lower and upper bounds is shown in FIG. 4.

Figure 2:
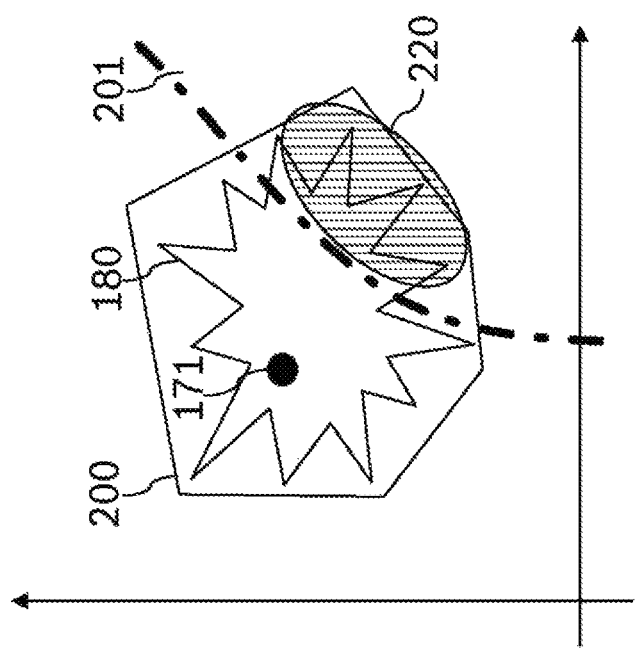
FIG. 2 shows two schematic depictions of the output value each with the adversarial polytope and a decision boundary.
Figure 2:
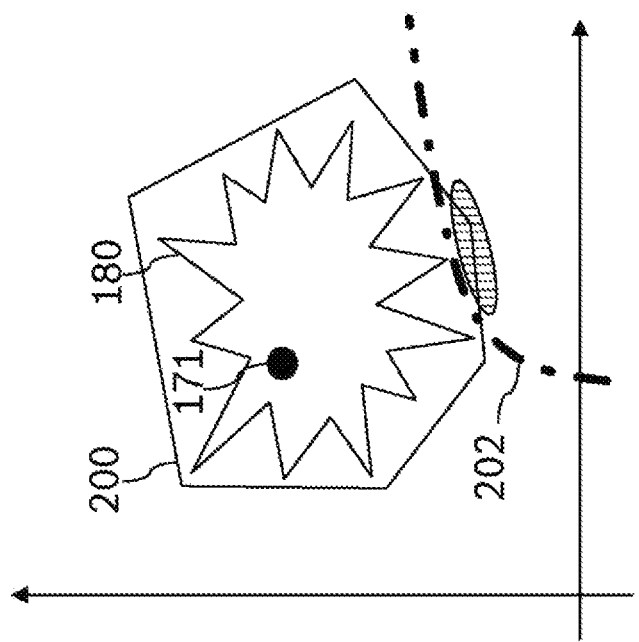

As already discussed, if the objective function is positive, then there does not exist a modification of the input value x that can fool the neural network 100. However, if the objective function is negative, it cannot be guaranteed that all modifications of the input value x will be classified correctly. As schematically shown in FIG. 2, the output value 171 of the neural network 100 is bounded by an output adversarial polytope 180. The output adversarial polytope 180 is a non-convex set due to the non-linear activation functions, such as the ReLu activation function, of the neural network 100. For simplification, the non-linear activation functions can be approximated, which results in an approximation of the output adversarial polytope 180.

The approximation of the ReLu activation function can be done by bounding the ReLu with a convex hull. The convex hull is described by three linear equations, one for the negative input values, one for the positive input values and a third linear equation, which closes the spanned area of the two linear equations to a convex hull. The approximation of the output adversarial polytope is shown in FIG. 2 by the bounded convex polytope 200.

Furthermore, FIG. 2 shows a decision boundary 201, which crosses the output adversarial polytope 180 and the bounded convex polytope 200. A decision boundary is the region of a problem space in which the output label of a classifier is ambiguous. Because the decision boundary crosses the adversarial polytope 180, there are output values which can be misclassified. In FIG. 2, the output value 171 of the neural network 100 can be misclassified if it is within the area 220 of the output adversarial polytope 180. If the modification of the input value results in a shift of the output value of the neural network 100 into the area 220, a false classification of the input value will result. For this case, the objective function would be negative since a shift of the output value 171 could result in another classification, when crossing the decision boundary 201. For this case, there does not exist a robustness against misclassifying modifications of the input value.

If a second decision boundary 202 crosses only the bounded convex polytope 200, but not the output adversarial polytope 180, then the objective function J is also negative although any modification of the input value x would not result in false classification since all possible output values lie within the output adversarial polytope 180 which is not divided by the second decision boundary 202. For this case, there would be a robustness against misclassifying modifications of the input value. However due to the approximation of the output adversarial polytope 180, the objective function (J) is not accurate.

Therefore, if the objective function J is negative, it is not possible to determine whether a modification of the input could fool the neural network 100. Only for positive objective functions can a guaranteed decision be made that the modification of the input value will not fool the neural network 100.

Figure 3:
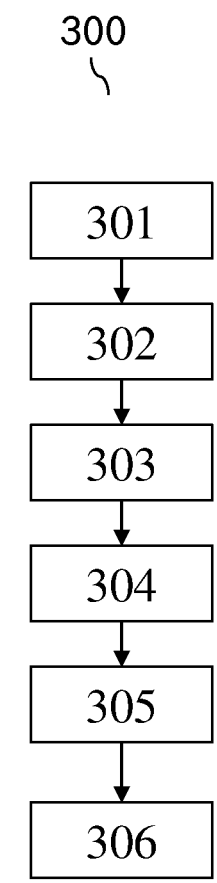
FIG. 3 shows schematically an embodiment of a flow chart for a method for determining an objective function.

FIG. 3 shows a schematic flow chart 300 of a method for determining the objective function J of equation (8). The method starts with step 301. In this step 301, the input value x and the true classification $y^{true}$ of the input value x and the target classification $y^{targ}$ and a given perturbation $\epsilon$ are provided. Then, in step 302, the variable c according to equation (3) is determined. In the subsequent step 303, the input value x is propagated through the neural network 100 and the upper and lower bounds (l, u) of the activations of the neurons (or the activation functions) are determined. The method for determining the upper and lower bounds (l, u) is discussed below in connection with FIG. 4.

After finishing step 303, step 304 is carried out. In this step, the dual neural network is built according to the equation (9) using the upper and lower bounds (l, u). Afterwards, step 305 is carried out. In this step, the variable c is propagated through the dual neural network according to equation (9). A more detailed description of the steps 304 and 305 is given in FIG. 5. In step 306, the objective function J according to equation (8) is determined dependent on the input value x and dependent on the output value $v_1$ of the dual neural network and the given perturbation $\epsilon$.

FIG. 4 shows the neural network 100 with a skip connection 410. In this embodiment of the neural network 100, all neurons may have a ReLu activation function. Further, FIG. 4 shows an embodiment of a flow chart 400 of a method for determining the upper and lower bounds of the input value of the layers of the neural network 100 with a skip connection 410, in particular, a method for determining the upper and lower bounds of the activations of the neurons with a ReLu activation function.

The method for determining the upper and lower bounds of the input value of the layer starts with step 401. In this step, the input value x and the perturbation E are provided and diverse variables are initialized according to following equations:

$$\hat{v}_1 := W_1^T$$

$$\gamma_1 = b_1^T$$

$$l_2 = x^T W_1^T + b_1^T - \epsilon \|W_1^T\|_{1,:}$$

$$u_2 = x^T W_1^T + b_1^T + \epsilon \|W_1^T\|_{1,:} \quad (13)$$

wherein $\|\;\|_{1,:}$ denotes the matrix $l_1$ norm of all columns, for this example. Other norms are also conceivable.

In step 402, a loop is started over the layers of the neuronal network. The loop is initialized by i=2 and repeated until i equals k-1. In the first step 403 of the loop, the activations sets $I_i^-$, $I_i^+$, $I_i$ are determined dependent on the values of the upper and lower bounds of the layer (i).

Then, in step 404 new terms are initialized according to the equations:

$$v_{i,I_i} := (D_i)_{I_i} W_i^T$$

$$\gamma_i = b_i^T \quad (14)$$

Afterwards (step 405), the existing terms are propagated according to equation:

$$v_{j,I_i} := v_{i,I_i} (D_i)_{I_i} W_i^T, j=2, \ldots, i-1$$

$$\gamma_i := \gamma_i D_i W_i^T, j=1, \ldots, i-1$$

$$\hat{v}_1 := \hat{v}_1 D_i W_i^T \quad (15)$$

In step 406, the bounds are computed as:

$$\psi_i := x^T \hat{v}_1 + \sum_{j=1}^{i} \gamma_j \quad (16)$$

$$l_{i+1} = \psi_i - \epsilon \|\hat{v}_1\|_{1,:} + \sum_{j=2}^{i} \sum_{i' \in I_i} l_{i,j} \max[-v_{j,i'}, 0]$$

$$u_{i+1} = \psi_i + \epsilon \|\hat{v}_1\|_{1,:} - \sum_{j=2}^{i} \sum_{i' \in I_i} l_{i,j} \max[v_{j,i'}, 0]$$

Additionally, the loop index i is increased in step 406. If i equals k-1, then step 407 is carried out. In this step, the upper and lower bounds $l_{1:k}$, $u_{1:k}$ are returned. Otherwise ($i<k-1$), steps 403 to 406 are repeated. Note that if each neuron does not have a non-linear activation function, it is not required to determine the bounds for each neuron.

Note that if the neural network comprise other non-linear activation functions, equation (16) can be modified with respect to equation (6) by replacing each sum: $\pm\Sigma_{j=2}^{i}\Sigma_{i\in I_i}\pm$ by $\pm\Sigma_{j=1}^{i}h_j(\pm v_j, \ldots, \pm v_i)$, respectively. In addition, the dual transformations $g_i$ have to be applied in step 404 and 405.

Figure 5:
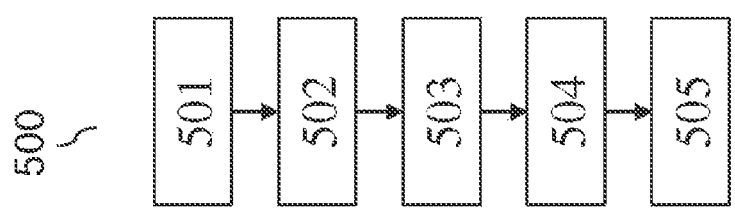
FIG. 5 shows a schematic embodiment of a flow chart of a method for propagating an input value through a dual neural network and shows further a schematic depiction of the dual neural network.
Figure 5:
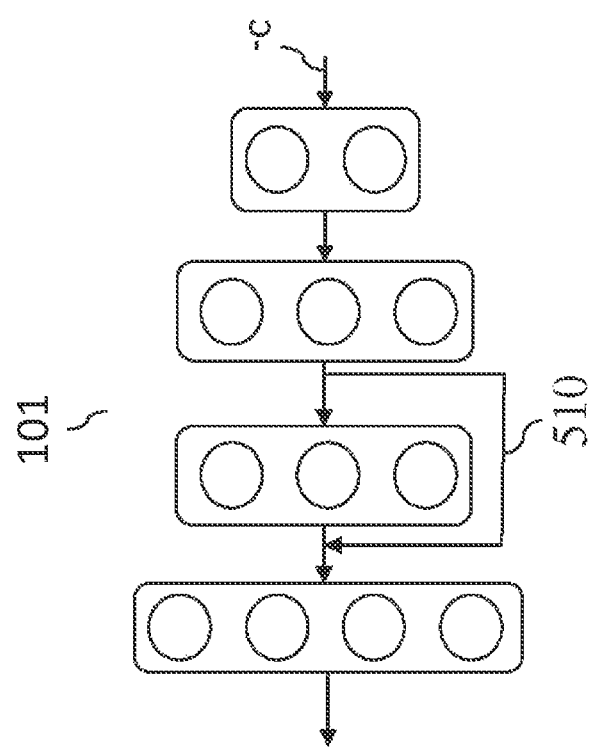

FIG. 5 shows the dual neural network 101 with a dual skip connection 510. In this embodiment of the dual neural network 101, the dual neural network 101 is created based on the neural network 100 shown in FIG. 4. Further, FIG. 5 shows an embodiment of a flow chart 500 of a method for building the dual neural network 101 and propagating an input value—c through the dual neural network 101 according to equation (9).

This method starts with step 501 by creating the dual neural network 101. Exemplarily, the architecture of the neural network 100 is copied and the input layer and output layer of the neural network 100 are reconfigured as output layer and input layer, respectively, of the dual neural network 101. This means that when the input value—c is propagated through the dual network 101, relative to the propagation of the input of the neural network 100, the input of the dual neural network 101 is propagated backwards. Note that when the dual network in FIG. 5 is rotated by 180 degrees, then the input value of the dual neural network propagates forward through the dual neural network relative to the neural network 100.

In step 502, the activation functions of each layer are replaced by a respective dual activation function. The dual activation function can be determined according to equations (6) or equations (10) to (12).

In subsequent step 503, the input of the dual neural network 101 receives as input the variable c or according to equation (9) as input value is utilized—c to determine the objective function J as solution of the dual problem.

Thereafter (step 504), the input of the dual neural network 101 is propagated layer-wise through the dual network 101. After the output layer has determined its output value in step 504, in the succeeding step 505, this output value is returned as output value of the dual neural network 101.

Figure 6:
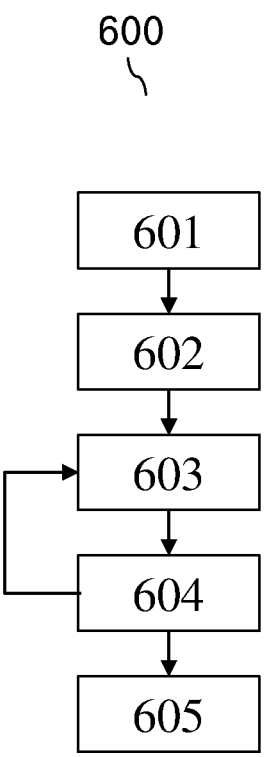
FIG. 6 shows schematically an embodiment of a flow chart of a method for training the neural network by the objective function.

FIG. 6 shows an embodiment of a flow chart 600 of a method to train the neural network 100 to be guaranteed robust against adversarial perturbations of the input values of the neural network 100.

This training method starts with step 601. Here, training data comprises N training input values x and N training output values $y^{true}$, which are assigned to the trainings input values x, respectively. The output values $y^{true}$ can be true classifications of the respective input values x. The perturbation value $\epsilon$ is also given in step 601. Note that the training data comprising N pairs of input values and output values is called a batch. If more than one batch is available, this method can be repeated for each batch. Additionally or alternatively, the method can be repeated for the same batch several times until a given criterion is met. Note that this training method can be also used for unsupervised learning, wherein in accordance with the unsupervised learning approach, the training data should be accordingly structured and/or labeled. It is also conceivable that each training input value x may have more than one corresponding training output value $y^{true}$.

Subsequently, a loop for $i=1, \ldots, N$ over the training data is started in step 602. In step 603, for the i-th training input value $x_i$, the variable $c_i$ according to equation (3) is generated for each desired target classification $y_i^{targ}$ different from the assigned true classification $y_i^{true}$. The variable $c_i$ for each desired target classification can be expressed as a matrix: $e_{y_i}1^T - \text{diag}(1)$. Each determined variable $c_i$ comprised in said matrix, can be utilized to determine the objective function J for the i-th training input value $x_i$. Then, the objective function $J_i$ is determined according to the method shown in FIG. 3.

Afterwards (step 604), a loss function $L_i$, characterizing a difference between the determined objective function $J_i$ and the training output value $y_i$, is determined. Preferably, a 0-1 loss function is utilized. It is also possible to use several different loss functions for the different output values of the dual network 101, objective functions and/or for the different utilized training output values. The index i of the loop is increased by one and steps 603 and 604 is repeated until the index i equals N, as defined in step 602.

When the loop over all training data is finished, step 605 is carried out. Here, each determined loss function $L_i$ is summed up and the sum over all loss functions is optimized, for example:

$$\min_\theta \sum_{i=1}^{N} L_i\{-J_\epsilon(x_i, g_\theta(e_{y_i}1^T - \text{diag}(1))), y_i\} \quad (17)$$

The equation (17) can be optimized by gradient descent. The gradient descent determines the change $\Delta\theta$ of the parameter $\theta$ of the neural network (100) in order to minimize the sum over the loss functions $L_i$. Advantageously, the change $\Delta\theta$ of the parameter $\theta$ is used to adjust said parameters and step 605 is repeated until the determined change $\Delta\theta$ of the parameter $\theta$ is smaller than a given threshold.

If the dual layers for all operations are linear, the bounds for all layers can be computed with a single forward pass through the dual network using a direct generalization. By trading off tightness of the bound with computational efficiency by using linear dual layers, we can efficiently compute all bounds and construct the dual network one layer at a time. The end result is that dual networks can be automatically constructed from dual layers in a fully modular fashion, completely independent of the overall network architecture (similar to how auto-differentiation tools proceed one function at a time to compute all parameter gradients using only the local gradient of each function).

Improving Efficiency

A limiting factor of the proposed algorithm and the work of Wong and Kolter [2017] is its computational complexity: for instance, to compute the bounds exactly for $l^\infty$ norm bounded perturbations in ReLu networks, it is computationally expensive to calculate $\|v_1\|_q$ and $\Sigma_{j\in I_i}l_i(v_{ij})_+$. In contrast to other terms like $v_{i+1}^T b_i$ which require only sending a single bias vector through the dual network, the matrices $v_1$ and $v_{i,I_i}$ must be explicitly formed by sending an example through the dual network for each input dimension and for each $j\in I$, which renders the entire computation quadratic in the number of hidden units. To scale the method for larger, ReLU networks with $l^\infty$ perturbations, we look to random Cauchy projections. Note that for an $l_2$ norm bounded adversarial perturbation, the dual norm is also an $l_2$ norm, so we can use traditional random projections.

Figure 7:
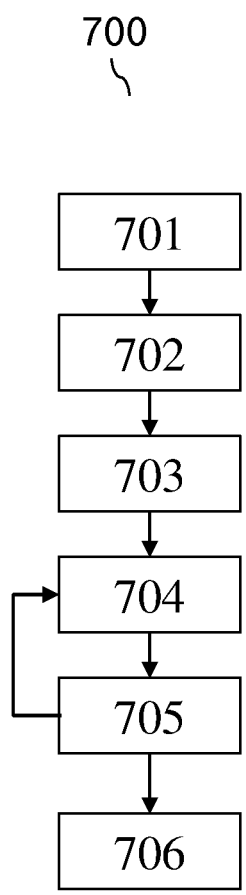
FIG. 7 shows a schematic embodiment of a flow chart of a method for determining a random Cauchy projection.

FIG. 7 shows schematically a flow chart 700 of a method to increase the efficiency and speed up the training method described in FIG. 6, particularly to speed up step 603, using random Cauchy projections. It is also possible to utilize this method to speed up the step 306 of FIG. 3.

Recap the objective function defined by equation (8): $J(x, v_{1:k}) = -\sum_{i=2}^{k} h_i (v_{i:k}) - v_1^T x - \epsilon \|v_1\|_q$. The computation of the second and third terms ($v_1^T x$, $\epsilon \|v_1\|_q$) are dependent on the whole dual neuronal network 101, and therefore computationally expensive (e.g, quadratic). However, these terms can be efficiently approximated according to the method shown in FIG. 7.

In the first step 701, the lower and upper bounds for each layer of the dual network 101 are given. In the next step 702, a matrix $R_1$ is initialized with a size of $|z_1| \times r$. The elements of the matrix $R_1$ are sampled from a Cauchy distribution. Note that this matrix $R_1$ corresponds to the lower bound $l_1$. Subsequently, in step 703, a loop over the layers $i=2, \ldots, k$ is started with loop index i.

In the step 704, over an index $j=1, \ldots, i-1$ is iterated, wherein for each value of the index j, a new random matrix $R_j^i := \sum_{k=1}^{i-1} g_{k,i}^T(R_i^k)$ is determined and $S_j^i := \sum_{k=1}^{i-1} g_{k,i}^T(S_i^k)$ is determined. This corresponds to propagating r random vectors (and an additional vector, e.g. $1^T$) through the dual network.

After step 704 has been finished, step 705 is carried out. In step 705, a new matrix $R_i^1 := \text{diag}(d_i)\text{Cauchy}(|z_i|, r)$ and $S_i^1 := d_i$ are determined ($d_i$ is determined according to equation (19)). Then, the index i is increased by one and steps 704 and 705 are repeated until $i=k$ is fulfilled.

In step 706, the term $\|v_1\|_q$ and the term $h_i(v_{i:k})$ for the ReLu layer can be more efficiently calculated. For the case that the dual norm is equal to the $l_1$ norm, this can be efficiently calculated by:

$$\|v_1\|_1 \approx \text{median}(|g(R)|) \approx \text{edian}(|RW_1^T D_2 W_2^T \ldots D_n W_n|) \approx \text{median}(|v_1^T R|) \quad (18)$$

where R is a $|z_1| \times r$ standard Cauchy random matrix, and the median is taken over the second axis.

The second term of the ReLu activation function (i.e., $v_1^T R$) is expressed as:

$$\sum_{j \in I} l_{i,j} \times \max[v_{i,j}, 0] \approx \frac{1}{2} \left[ -(\text{median}(|g_j(h(R))|) + g_j(h(1^T))) \right] \approx \quad (19)$$

$$\frac{1}{2}(-\text{median}(|v_i^T \text{diag}(di)R|) + v_i^T d_i)$$

with $d_{i,j} = \begin{cases} \dfrac{u_{i,j}}{u_{i,j} - l_{i,j}}, & j \notin I_i \\ 0, & j \in I_i \end{cases}$ $\epsilon \|v_1\|_q$ This estimate has two main advantages: first, it is simple to compute, as evaluating $v_i^T R$ involves passing the random matrix forward through the dual network (similarly, the other term requires passing a modified random matrix through the dual network). Second, it is memory efficient in the backward pass, as the gradient need only propagate through the median entries.

These random projections reduce the computational complexity of computing these terms to piping r random Cauchy vectors (and an additional vector) through the network. Crucially, the complexity is no longer a quadratic function of the network size: if we fix the projection dimension to some constant r, then the computational complexity is now linear with the input dimension and $I_i$. Since previous work was either quadratic or combinatorially expensive to compute, estimating the bound with random projections is the fastest and most scalable approach towards training robust networks. At test time, the bound can be computed exactly, as the gradients no longer need to be stored. If desired, it is possible to use a different estimator (specifically, the geometric estimator) for the $l^\infty$ norm to calculate high probability bounds on the adversarial problem.

A final major challenge of training models to minimize a robust bound on the adversarial loss, is that the robustness penalty acts as a regularization. For example, in a two-layer ReLU network, the robust loss penalizes $\epsilon \|v_1\|_1 = \epsilon \|W_1 D_1 W_2\|_1$ with weight $\epsilon$. Because of this, the resulting networks (even those with large representational capacity), are typically overregularized to the point that many filters/weights become identically zero (i.e., the network capacity is not used).

To address this point, a method is proposed that involves cascading networks. The idea is to train a first level neural network a sequence of robust classifiers. The training examples which are not properly classified (i.e., those examples that lie within $\epsilon$ of the decision boundary), are used as training input for a second level neural network, and the training examples which are not properly classified by the second level neural network are used as training examples for a third level neural network, and so on. The cascade method can be implemented with any adversarial training strategy, not just the methods described herein.

Figure 8:
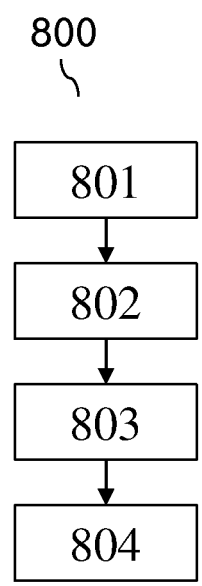
FIG. 8 shows schematically an embodiment of a flow chart of a method for detecting adversarial examples during interference of the neural network.

FIG. 8 shows an embodiment of a flow chart 800 of a method for detecting possible adversarial examples of the input value x. In the first step 801, the neural network 100 determines dependent on an input value an output value $y^{pred}$. In step 802, the objective function J is determined for all possible target classifications according to following equation:

$$J_\epsilon(x, g_\theta(e_y \text{pred} 1^T - \text{diag}(1))) \quad (20)$$

In the succeeding step 803, the objective function J is compared with a threshold. For example: $J_\epsilon(x, g_\theta(e_y \text{pred} 1^T - \text{diag}(1))) \geq 0$, then there does not exist a modification of the input that can be misclassified by the neural network 100. If the objective function J is positive, then the result of the comparision is true, which characterizes that there does not exist a modification of the input image within the ball B(x) that could be misclassifyed. Otherwise, if the objective function is not positive, the result of the comparison is false.

Optionally, step 804 is carried out. In this step, the output value $y^{pred}$ of the neural network 100 is released or rejected dependent on the result of the comparison. E.g. if the result of the comparison is true, the output value $y^{pred}$ can be utilized to control a technical system (for more information, see FIG. 12). Alternative, an authorization signal or a robustness certificate can be generated, when the result of step 803 is true. The authorization signal or the robustness certificate can be used to check before utilizing the output value $y^{pred}$. Preferably, the authorization signal and/or the robustness certificate are encrypted to prevent a maliciously manipulating.

Figure 9:
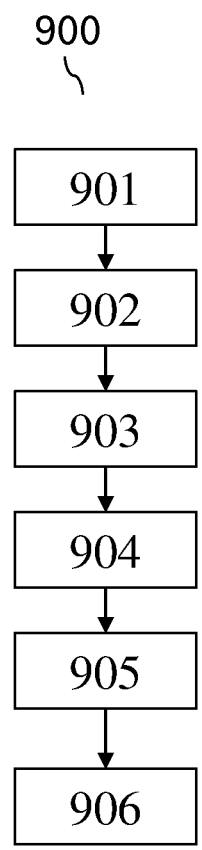
FIG. 9 shows a schematic embodiment of a flow chart of a method for finding a maximal allowable perturbation of the input value(s)

FIG. 9 shows schematically a flow chart 900 of a method to determine the largest perturbation value $\epsilon$ such that the output value of the neural network 100 cannot be flipped probably to another class than the determined class by the neural network 100. This can be also seen as a measurement, how far the decision boundary is away from the output of the neural network.

In the first step 901, the neural network 100 determines dependent on an input value an output value $y^{pred}$. In step 902, the objective function J is determined for all possible target classifications $J_\epsilon(x, g_\theta(e_y^{pred} 1^T - \text{diag}(1)))$. Subsequently (step 903), the largest perturbation value $\epsilon$ is determined. This can be determined according to following equation:

$$\max_\epsilon \epsilon \quad (21)$$
$$\text{subject to } J_\epsilon\left(x, g_\theta\left(e_{y,pred} 1^T - \text{diag}(1)\right)\right) \geq 0$$

Particularly, equation (21) can be solved utilizing Newton's method. Additionally or alternatively, a binary search can be used to solve equation (21). Another way to solve equation (21) can be by incrementally increasing $\epsilon$ while the objective function stays positive.

Optionally, if the largest perturbation value for the given input value is determined, steps 901 until 903 can be repeated for another input value. If more than two largest perturbations are determined for different input values, steps 904 and 905 can be carried out. Here, the smallest determined perturbation value is ascertained at step 904 and returned at step 905. Dependent on this returned perturbation value, a robustness certificate can be generated at step 906. This robustness certificate can be used in one of the described methods, where a given perturbation value $\epsilon$ is required.

Figure 10:
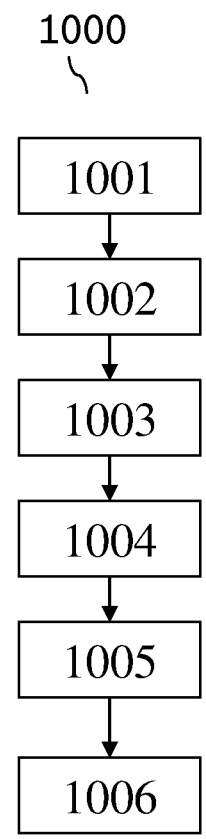
FIG. 10 shows a schematic embodiment of a flow chart of a method for determining tighter bounds of the activation function.

FIG. 10 shows schematically an embodiment of a flow chart 1000 of a method for determining tighter bounds of the activation functions, in particular of the neurons with a ReLu activation function. The method starts with step 1001. In this step a neural network 100 is given, wherein the neural network can be described by $f_\theta$ with ReLu activation functions and exemplary with a batch normalization layer. Moreover, in step 1001 the input value x and the perturbation $\epsilon$ are provided.

In the subsequent step 1002, upper and lower bounds $l_i, u_i$ are determined for each layer i, in particular for each neuron of the layers. The upper and lower bounds can be determined according to the method shown in FIG. 4. Alternatively, the upper bounds can be determined by propagating through the dual neural network 101 the variable c, which is given for this case by a positive diagonal matrix c=I, which can be column-wise propagated through the dual neural network 101 and the max. values for each layer of said propagated diagonal matrices scaled dependent on the input value (x) are used as the upper bounds. The same procedure can be done by propagating c=−1 and determine thereof the maximum value, which are the lower bounds.

Then, in step 1003, in addition to the determined upper and lower bounds of step 1002, a linear inequality $A_i z_i \leq b_i$ is initialized and the input value $z_i$ of the layer i are limited to following allowable i set of input values:

$$\tilde{Z}_i = \{z_i | l_i \leq z_i \leq u_i \cup A_i z_i \leq b_i\} \quad (22)$$

The initialization of the matrix $A_i$ is done by choosing an arbitrary size m of the first dimension of the matrix $A_i$, wherein the second dimension is dependent on the size of the layer: $\dim(z_i)$. The first dimension of the matrix $A_i$ can be proportional to the position of the corresponding layer i in the neural network 100 and polynomial to the number of neurons of the corresponding layer i.

Preferably, the first layer of the neural network 100 comprises a matrix $A_i$, which has the advantage that a better approximation of the norm bounded modification of the input value can be described. Deeper layers, e.g. the last few layers, should comprise a matrix $A_i$ in order to minimize the error between the output adversarial polytope 180 and the bounded convex polytope 200. Furthermore, the deeper the layers of the neuronal network 100 get, the larger the size of the matrix $A_i$ should be choosen. By choosing a certain size m of the matrix $A_i$, m additional constraints are added to limit the allowable set $\tilde{Z}_i$ of input values.

In another embodiment of the matrix $A_i$, said matrix can be a convolution matrix.

In step 1004, the elements of the matrix $A_i$ are determined. There are two options to determine the elements of the matrix $A_i$. In the first option, the elements are randomly sampled from a given distribution (e.g. Gaussian distribution, aligned around the origin). In the other option, the elements are the upper and lower bounds of a previous layer.

The vector $b_i$ of the linear inequality $A_i z_i \leq b_i$ can be determined according to the alternative method for determining the upper bounds by propagating $c_i = A_i$ row-wise through the dual neural network to determine the vector $b_i$ (similar to step 1002 for determining the upper and lower bounds by propagation the matrix I through the dual neural network).

In the succeeding step 1005, the elements of the matrix $A_i$ are optimized. For the case that the activation functions are given by the ReLu activation function, the optimization over the elements of the matrix $a_i$ can be done by solving the following equation in particular by gradient descent dependent on the elements of the matrix $A_i$:

$$\min_{\lambda \geq 0} b_i^T \lambda + \sum_{j \in I_i^-} \max\{(a_{i,j}^T \lambda + v_{i,j})l_{i,j}, (a_{i,j}^T \lambda + v_{i,j})u_{i,j}\} + \quad (23)$$
$$\sum_{j \in I_i^+} \max\{(a_{i,j}^T \lambda + v_{i,j} - v_{i+1,j})l_{i,j}, (a_{i,j}^T \lambda + v_{i,j} - v_{i+1,j})u_{i,j}\} +$$
$$\sum_{j \in I_i} \max\{(a_{i,j}^T \lambda + v_{i,j})l_{i,j}, (a_{i,j}^T \lambda + v_{i,j} - v_{i+1,j})u_{i,j}, 0\}$$

In a further embodiment, the step size of the gradient descent can be varied dependent on the progress of finding the minimum of equation (23).

If the elements of the matrix $A_i$ are choosen to be the upper and lower bounds of the previous layer, the elements of the matrix $A_i$ can be optimized according to equation (23) similarly by utilizing gradient descent. Additionally or alternatively, the initialized matrix $A_i$ can be optimized by multiplying the matrix $A_i$ by an inverse matrix characterizing the transformation of the previous layer. Preferably, the inverse matrix is the inverse or pseudo-inverse, left- or a right inverse of the matrix $W_i$ containing in particular the weights of the previous layer.

After the elements of the matrix $A_i$ are optimized in step 1005, the vector $b_i$ can be updated in step 1006. For example as done in step 1004.

In an optional subsequent step, the upper and lower bounds can be update, e.g. according to step 1002. It is possible to repeat the step 1005 and step 1006 since the matrix $A_i$ and the vector $b_i$ are linked with each other and if one of them is changed, the other has to be adapted.

The dual transformations of the respective dual layer i of the dual neural network can be determined by the matrix $A_i$ together with the already determined or update upper and lower bounds of the respective dual layer i. The optimization problem according to equation (23) has to be solved (e.g. by gradient descent) dependent on λ (find a value for λ that minimizes the optimization problem of equation (23)) to determine the dual transformation, which is characterized by equation (23) as an upper bound according to equation (6) of a conjugate ReLu function.

Figure 11:
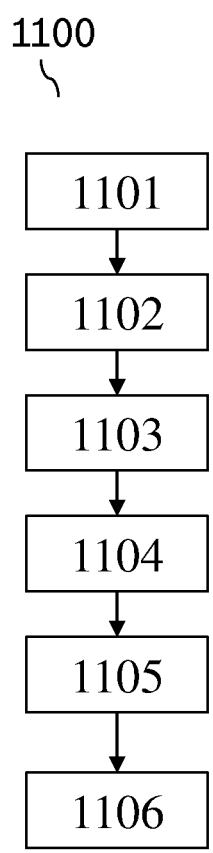
FIG. 11 shows schematically an embodiment of a flow chart of a method for operating an at least partly autonomous robot with the neural network.

FIG. 11 depicts a flow chart 1100 of a method for utilizing the trained neural network 100 for controlling a technical system, such as a partly autonomous robot or vehicle, and optionally detecting adversarial examples before controlling the technical system. Note that different configurations of the technical system are shown exemplary in the subsequent FIGS. 12 to 18.

Figure 19:
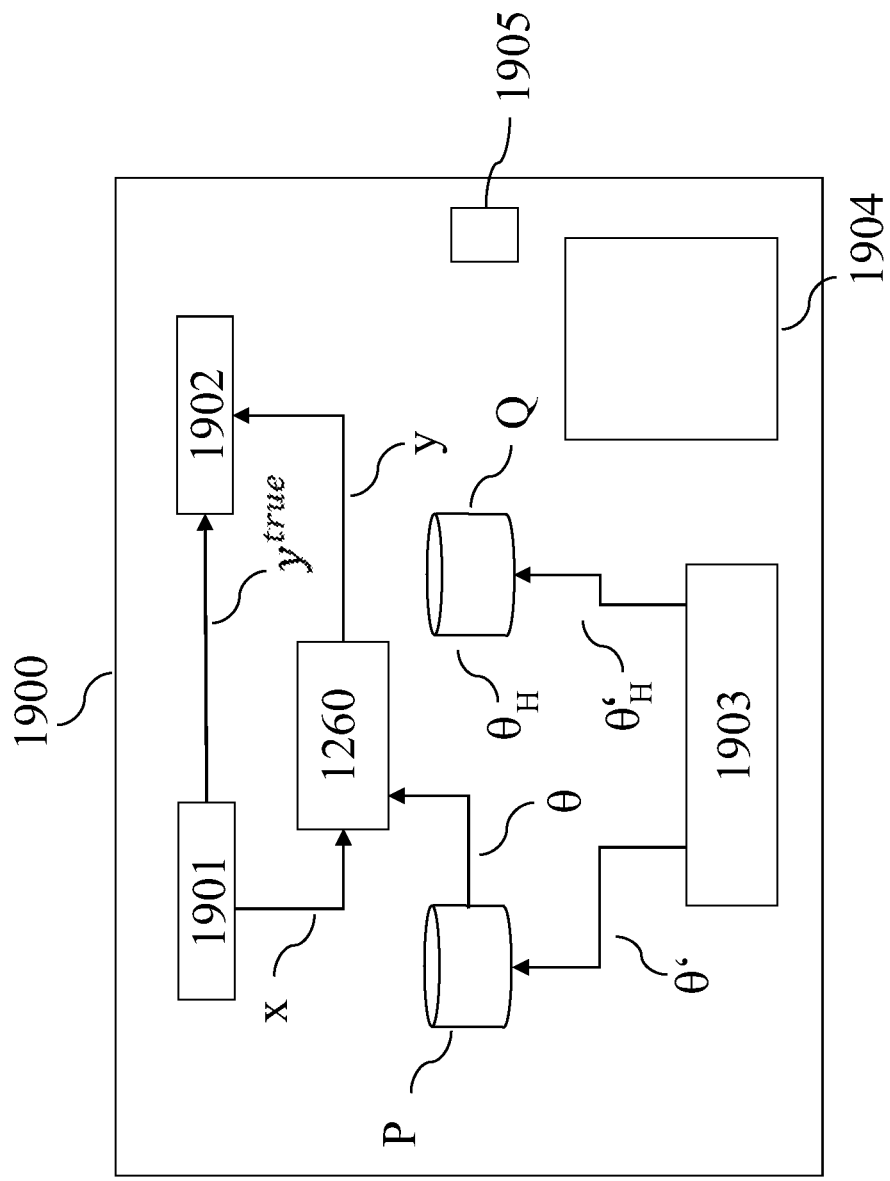
FIG. 19 a training system configured to train a robust neural network.

This method starts with step 1101. This step is used to acquire training data D comprising training input images and assigned training output values. The training input images can be images of a camera and the respective training output values can characterize a classification of the training images into one of several classes, e.g. class pedestrian or different road signs. These training data D can be provided a training system as shown in FIG. 19, which is configured to train the neural network 100 according to the method described in FIG. 6.

Subsequently (step 1102), the neural network 100 is trained according to the method described in FIG. 6 with the training data D of step 1101. After training the neural network 100, the method for determining the largest perturbation ε as described in FIG. 9 may be carried out, preferably, each training input image is used to determine the largest perturbation ε. Step 1102 can be carried out on a server or in the technical system itself. The trained neural network, in particular the parametrization and optional the architecture, and when applicable, the largest perturbation ε can be transmitted from the server into the technical system and stored in a storage of the technical system. Additionally, the method for testing the trained neural network on whether a modification of the input image can fool the trained neural network according to FIG. 3 can be carried out.

In step 1103, a sensor, e.g. the camera, of the technical system senses an environment and the trained neural network receives the sensor value, e.g. image.

In step 1104, the trained neural network determines an output value dependent on the sensor value.

Step 1105 may be carried out. Here, the received sensor value is checked whether it is an adversarial example of the sensor value as described in FIG. 8. An authentication signal can be generated dependent on the result of the detection of an adversarial example.

After step 1104 or step 1105, step 1106 is carried out. Dependent on the output value of step 1104, a control signal for the technical system is generated. The control signal may depend on the authentication signal of step 1105. In one embodiment, only if the authentication signal characterizes that the input of the neural network is not an adversarial example, then the control signal is generated. In another embodiment, the generated control signal can be discard dependent on the control signal. A motor or a braking system of the technical system can be controlled by the control signal of step 1106.

Figure 12:
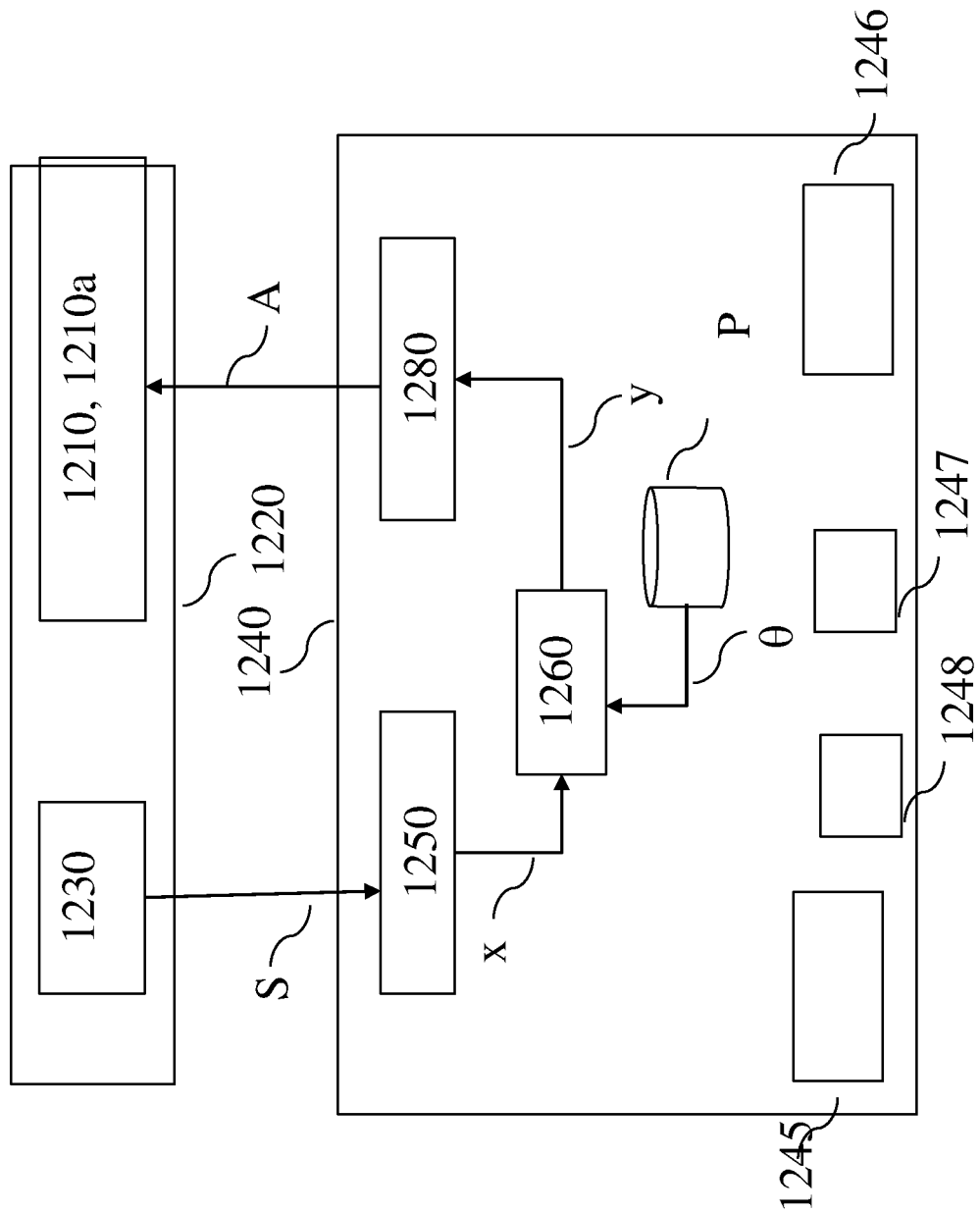
FIG. 12 an actuator control system having an automated learning system controlling an actuator.

Shown in FIG. 12 is one embodiment of an actuator 1210 in its environment 1220. Actuator 1210 interacts with an actuator control system 1240. Actuator 1210 and its environment 1220 will be jointly called actuator system. At preferably evenly spaced distances, a sensor 1230 senses a condition of the actuator system. The sensor 1230 may comprise several sensors. An output signal S of sensor 1230 (or, in case the sensor 1230 comprises a plurality of sensors, an output signal S for each of the sensors) which encodes the sensed condition is transmitted to the actuator control system 1240. In another embodiment, the actuator control system 1240 can receive fictive sensor values for testing the actuator control system 1240.

Thereby, actuator control system 1240 receives a stream of sensor signals S. It the computes a series of actuator control commands A depending on the stream of sensor signals S, which are then transmitted to actuator 1210.

Actuator control system 1240 receives the stream of sensor signals S of sensor 1230 in an optional receiving unit 1250. Receiving unit 1250 transforms the sensor signals S into input signals x. Alternatively, in case of no receiving unit 1250, each sensor signal S may directly be taken as an input signal x. Input signal x may, for example, be given as an excerpt from sensor signal S. Alternatively, sensor signal S may be processed to yield input signal x. Input signal x may, for example, comprise images, or frames of video recordings. In other words, input signal x is provided in accordance with sensor signal S.

Input signal x is then passed on to an automated learning system 1260, which may, for example, be given by the neural network 100.

Automated learning system 1260 is parametrized by parameters □, which are stored in and provided by parameter storage P.

Automated learning system 1260 determines output signals y from input signals x. Output signals y are transmitted to a conversion unit 1280, which converts the output signals y into control signals or control commands A. Actuator control commands A are then transmitted to actuator 1210 for controlling actuator 1210 accordingly.

Actuator 1210 receives actuator control commands A, is controlled accordingly and carries out an action corresponding to actuator control commands A. Actuator 1210 may comprise a control logic, which transforms actuator control command A into a further control command, which is then used to control actuator 1210.

In further embodiments, actuator control system 1240 may comprise sensor 1230. The sensor 1230 can be a camera, Radar or Lidar sensor. The sensors are not limited to those, other conceivable sensor as audio sensor are also applicable. In even further embodiments, actuator control system 1240 alternatively or additionally may comprise actuator 1210.

Furthermore, actuator control system 1240 may comprise a processor 1245 (or a plurality of processors) and at least one machine-readable storage medium 1246 on which instructions are stored which, if carried out, cause actuator control system 1240 to carry out the methods according to one of the previous figures.

Alternatively or additionally to actuator 1210, the embodiment may comprise a display unit 1210a which may also be controlled in accordance with actuator control commands A. Alternatively, the display unit 1210a belongs to a measurement system, wherein the automated learning system is used to determine a measurement value dependent on the input value.

In a further embodiment of the actuator control system 1240, the actuator control system 1240 comprises a robustness certificate generator 1247. The robustness certificate generator 1247 is configured to generate a robustness certificate corresponding to the method shown in FIG. 8 for example. A generated robustness certificate may be displayed on the display unit 1210a or may be used to release the control command A for controlling actuator 1210. In another embodiment the actuator control system 1240 comprise an adversarial example detector 1248 executing the method according to FIG. 8.

In all of the above embodiments, automated learning system 1260 may comprise a classifier that is configured to classify the input signal x belongs to one of several predefined classes. In another embodiment, the automated learning system 1260 is configured to classify an image region or is configured to pixel-wise classify an image.

Additionally or alternatively, the output signal y or the control signal or control command A is displayed on a display unit 1210a.

Figure 13:
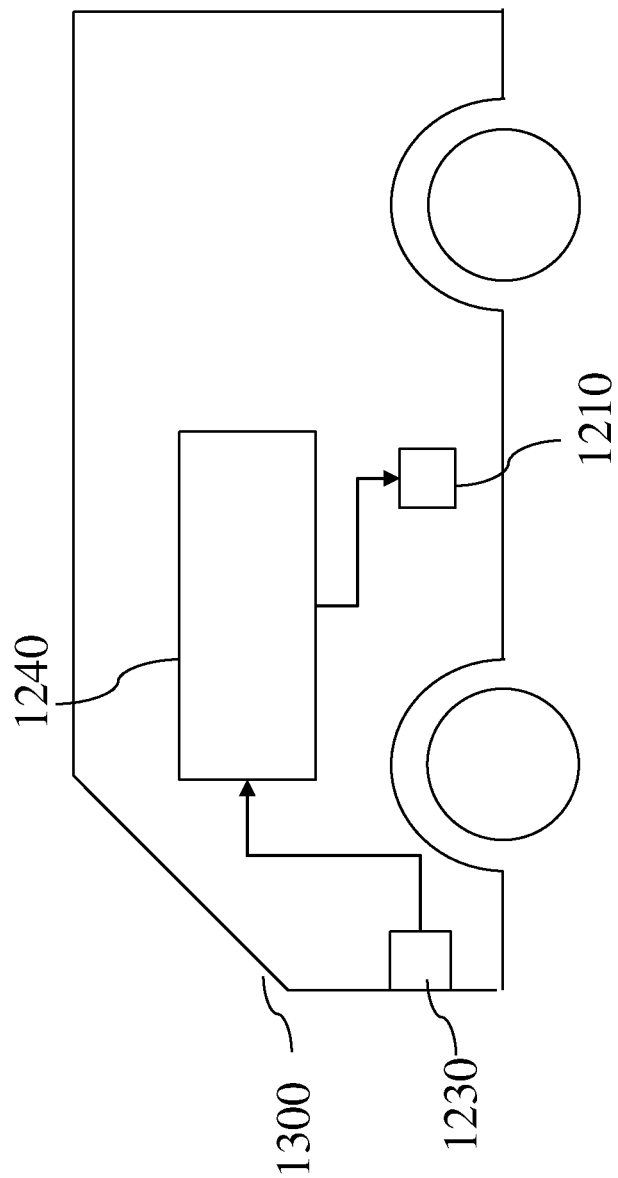
FIG. 13 the actuator control system controlling an partially autonomous robot.

FIG. 13 shows an embodiment in which actuator control system 1240 is used to control an at least partially autonomous robot, e.g. an at least partially autonomous vehicle 1300, dependent on the output value of the automated learning system 1260.

Sensor 1230 may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in vehicle 1300.

Alternatively or additionally sensor 1230 may comprise an information system for determining a state of the actuator system. One example for such an information system is a weather information system, which determines a present or future state of the weather in environment 1220. Further information can be received by communication system or via the internet.

For example, using input signal x, the automated learning system 1260 may for example detect objects in the vicinity of the at least partially autonomous robot. Output signal y may comprise an information that characterizes objects, which are located in the vicinity of the at least partially autonomous robot. Control command A may then be determined in accordance with this information, for example to avoid collisions with said detected objects.

Actuator 1210, which is preferably integrated in vehicle 1300, may be given by a brake, a propulsion system, an engine, a drivetrain, or a steering of vehicle 1300. Actuator control commands A may be determined such that actuator (or actuators) 1210 is/are controlled such that vehicle 1300 avoids collisions with said detected objects. Detected objects may also be classified according to what they automated learning system 1260 deems them most likely to be, e.g. pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 1230, preferably an optical sensor, to determine a state of plants in the environment 1220. Actuator 1210 may be a nozzle for spraying chemicals. Depending on an identified species and/or an identified state of the plants, an actuator control command A may be determined to cause actuator 1210 to spray the plants with a suitable quantity of suitable chemicals.

In even further embodiments, the at least partially autonomous robot may be given by a domestic appliance (not shown), like e.g. a washing machine, a stove, an oven, a microwave, or a dishwasher. Sensor 1230, e.g. an optical sensor, may detect a state of an object, which is to undergo processing by the household appliance. For example, in the case of the domestic appliance being a washing machine, sensor 1230 may detect a state of the laundry inside the washing machine. Actuator control signal A may then be determined depending on a detected material of the laundry.

Figure 14:
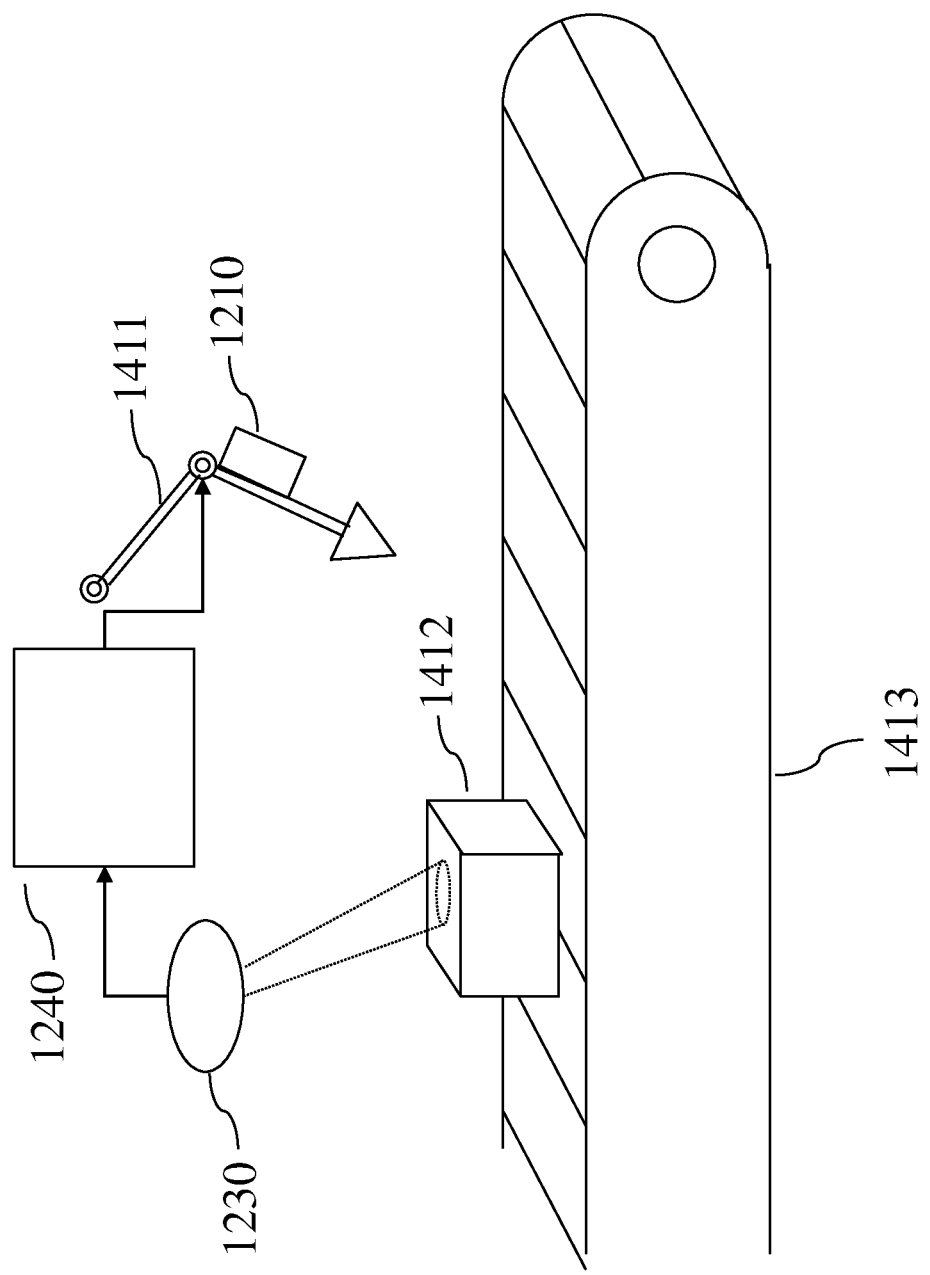
FIG. 14 the actuator control system controlling a manufacturing machine.

Shown in FIG. 14 is an embodiment in which actuator control system 1240 is used to control a component 1411 of a manufacturing machine 1411, (e.g. a punch cutter, a cutter or a gun drill) of a manufacturing system, e.g. as part of a production line. The actuator control system 1240 controls an actuator 1210 which in turn control a component 1413 of the manufacturing machine dependent on the output value of the automated learning system 1260 of the actuator control system 1240.

Sensor 1230 may be given by an optical sensor, which captures properties of e.g. a manufactured product 1412. Automated learning system 1260 may determine a state of the manufactured product 1412 or the manufactured product 1412 itself from these captured properties. Actuator 1210 which controls manufacturing machine 1411 may then be controlled depending on the determined state of the manufactured product 1412 for a subsequent manufacturing step of manufactured product 1412 determined by the automated learning system 1260 or determined by the actuator control system 1240. Alternatively, it may be envisioned that actuator 1210 is controlled during manufacturing of a subsequent manufactured product 1412 depending on the determined state of the manufactured product 1412.

Figure 15:
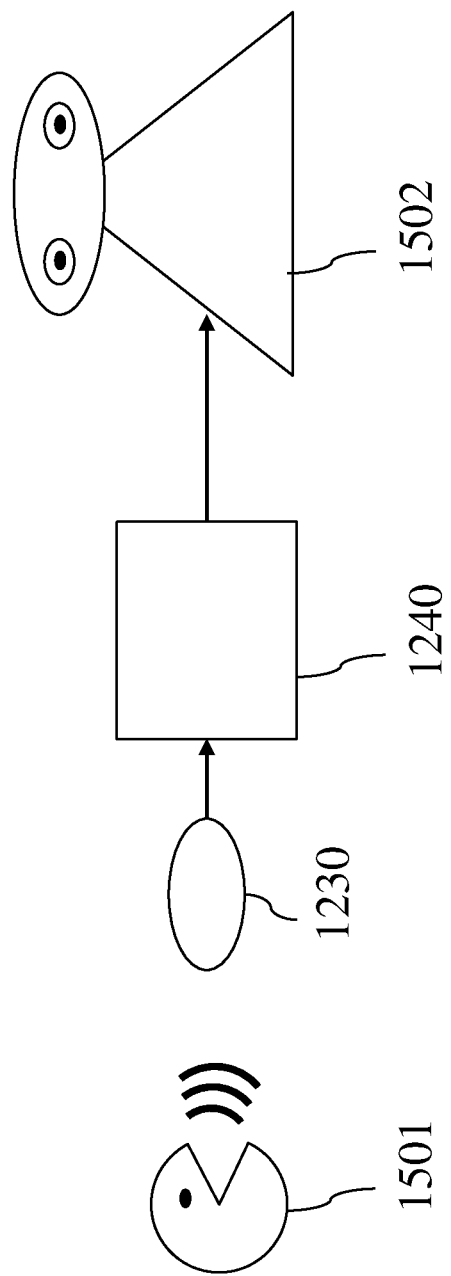
FIG. 15 the actuator control system controlling an automated personal assistant.

Shown in FIG. 15 is an embodiment in which actuator control system 1240 is used for controlling an automated personal assistant 1502. In a preferred embodiment, sensor 1230 may be an acoustic sensor, which receives voice commands of a human user 1501. Sensor 1230 may also comprise an optic sensor, e.g. for receiving video images of a gestures of user 1501.

Actuator control system 1240 then determines actuator control commands A for controlling the automated personal assistant 1502. The actuator control commands A are determined in accordance with sensor signal S of sensor 1230. Sensor signal S is transmitted to the actuator control system 1240. For example, automated learning system 1260 may be configured to e.g. carry out a gesture recognition algorithm to identify a gesture made by user 1501, or it may be configured to carry out a voice command recognition algorithm to identify a spoken command uttered by user 1501. Actuator control system 1240 may then determine an actuator control command A for transmission to the automated personal assistant 1502. It then transmits said actuator control command A to the automated personal assistant 1502.

For example, actuator control command A may be determined in accordance with the identified user gesture or the identified user voice command recognized by automated learning system 1260. It may then comprise information that causes the automated personal assistant 1502 to retrieve information from a database and output this retrieved information in a form suitable for reception by user 1501.

In further embodiments, it may be envisioned that instead of the automated personal assistant 1502, actuator control system 1240 controls a domestic appliance (not shown) controlled in accordance with the identified user gesture or the identified user voice command. The domestic appliance may be a washing machine, a stove, an oven, a microwave or a dishwasher.

Figure 16:
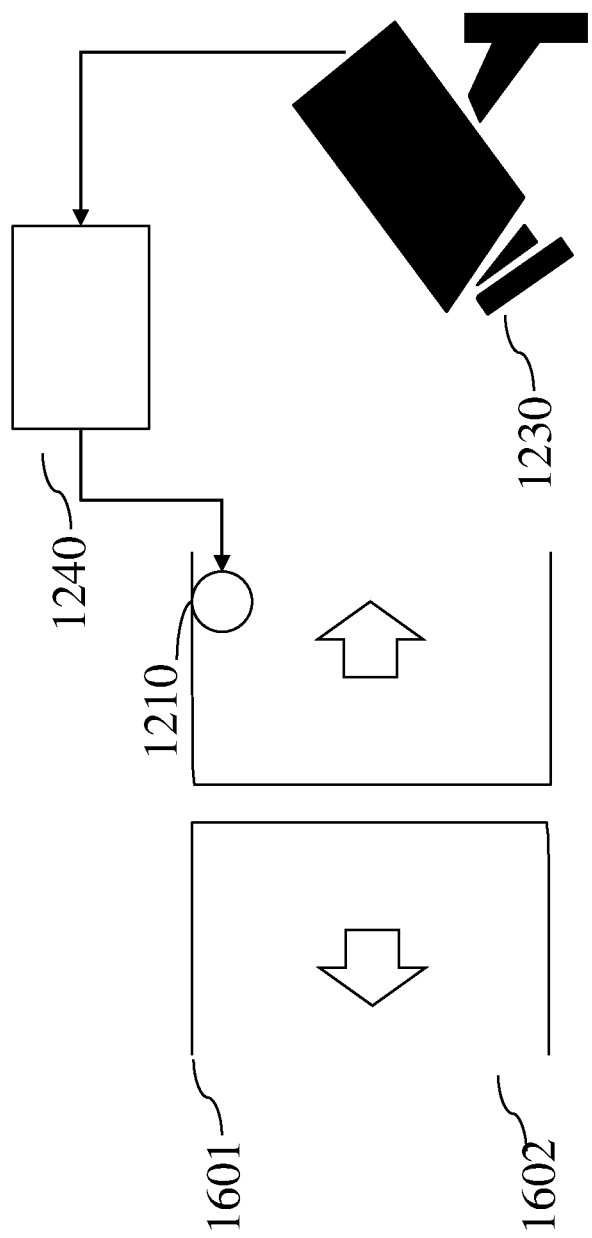
FIG. 16 the actuator control system controlling an access control system.

Shown in FIG. 16 is an embodiment in which actuator control system controls an access control system 1602. Access control system may be designed to physically control access. It may, for example, comprise a door 1601. Sensor 1230 is configured to detect a scene that is relevant for deciding whether access is to be granted or not. It may for example be an optical sensor for providing image or video data, for detecting a person's face. Automated learning system 1260 may be configured to interpret this image or video data e.g. by matching identities with known people stored in a database, thereby determining an identity of the person. Actuator control signal A may then be determined depending on the interpretation of automated learning system 1260, e.g. in accordance with the determined identity. Actuator 1210 may be a lock, which grants access or not depending on actuator control signal A. A non-physical, logical access control is also possible. In another embodiment, the actuator control system controls a heating system, wherein the actuator control system is configured to determine the desired climate of the owner dependent on a measured temperature and/or humidity values and optionally dependent on a weather forecast or the daytime.

Figure 17:
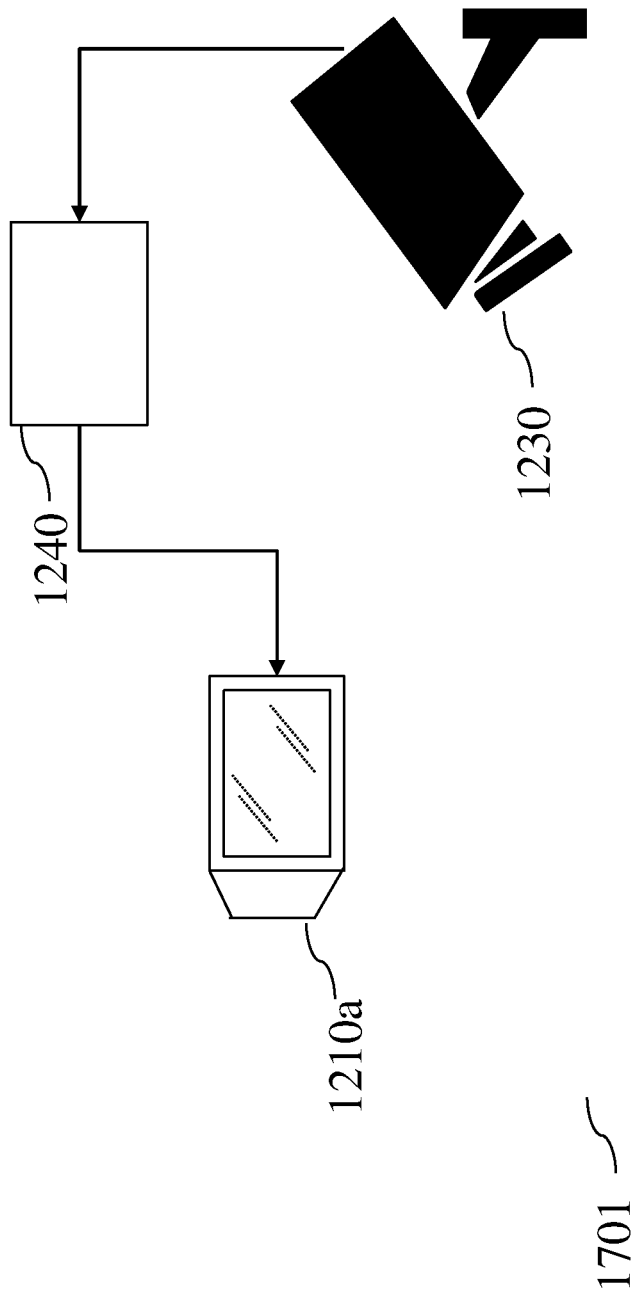
FIG. 17 the actuator control system controlling a surveillance system.

Shown in FIG. 17 is an embodiment in which actuator control system 1240 controls a surveillance system 1701. This embodiment is largely identical to the embodiment shown in FIG. 16. Therefore, only the differing aspects will be described in detail. Sensor 1230 is configured to detect a scene that is under surveillance. Actuator control system does not necessarily control an actuator 1210, but a display 1210a. For example, the automated learning system 1260 may determine whether a scene detected by optical sensor 1230 is suspicious. Actuator control signal A which is transmitted to display 1210a may then e.g. be configured to cause display 1210a to highlight an object that is deemed suspicious by automated learning system 1260.

Figure 18:
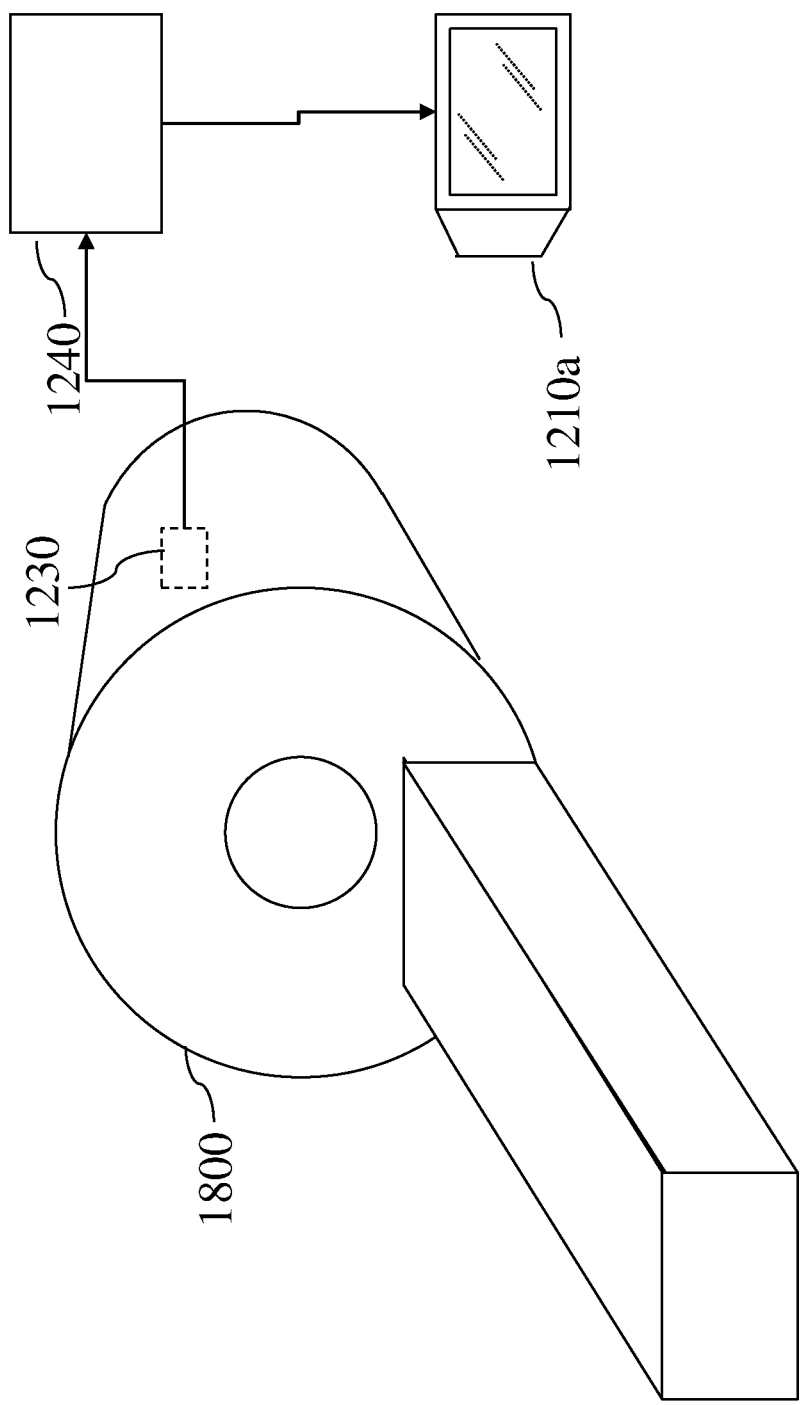
FIG. 18 the actuator control system controlling an, in particular medical, imaging system.

Shown in FIG. 18 is an embodiment of an actuator control system 1240 for controlling an imaging system 1800, for example an MRI apparatus, x-ray imaging apparatus or ultrasonic imaging apparatus. Sensor 1230 may, for example, be an imaging sensor, the sensed image of which is interpreted by automated learning system 1260. Actuator control signal A may then be chosen in accordance with this interpretation, thereby controlling display 1210a. For example, automated learning system 1260 may interpret a region of the sensed image to be potentially anomalous. In this case, actuator control signal A may be determined to cause display 1210a to display the imaging and highlighting the potentially anomalous region.

Shown in FIG. 19 is an embodiment of a training system 1900 for (re-)training automated learning system 1260, particularly the training system is configured to carry out the method according to FIG. 6. A training data unit 1901 determines input signals x, which are passed on to automated learning system 1260. For example, training data unit 1901 may access a computer-implemented database Q in which a set T of training data is stored. Set T comprises pairs of input signal x and corresponding desired labeled output signal $y^{true}$. Training data unit 1901 selects samples from set T, e.g. randomly. Input signal x of a selected sample is passed on to automated learning system 1260. Desired output signal $y^{true}$ is passed on to assessment unit 1902.

Automated learning system 1260 is configured to compute output signals y from input signals x. These output signals x are also passed on to assessment unit 1902.

A modification unit 1903 determines updated parameters θ' depending on input from assessment unit 1902. Updated parameters θ' are transmitted to parameter storage P to replace present parameters θ of the automated learning system or adjust the parameters according to the updated parameters θ'.

For example, it may be envisioned that assessment unit 1902 determines the value of the loss functions L depending on output signals y and desired output $y^{true}$. Modification unit 1903 may then compute updated parameters θ' using e.g. stochastic gradient descent to optimize the loss function L Furthermore, training system 1900 may comprise a processor 1904 (or a plurality of processors) and at least one machine-readable storage medium 1905 on which instructions are stored which, if carried out, cause actuator control system 1900 to carry out a method according to one aspect of the disclosure.

Preferably, the processor 1904 comprises at least a Central Processing Unit (CPU), a Graphics Processing Unit (GPU) and/or a Tensor Processing Unit (TPU). Alternatively, the processor 1904 can be partitioned into a distributed computer system, which are connected with each other via a communication system such as the internet. The computer system may comprise backend components, e.g. data sever, and middleware components, e.g. an application/client server and frontend components, e.g. a computer with a graphic interface and/or a sensor like a camera or a sensor network.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A non-transitory computer readable medium for training an automated learning system, the non-transitory computer readable medium storing program instructions that, when executed by a computer, cause the computer to:
process a plurality of first training inputs with a first neural network of the automated learning system and output a plurality of first training outputs, the first neural network having a plurality of layers including an input layer and an output layer, the input layer receiving the plurality of first training inputs, the output layer outputting at least one first training output for each of the plurality of first training inputs;
process the plurality of first training outputs with a second neural network of the automated learning system and output a plurality of second training outputs, the second neural network having a plurality of layers including an input layer and an output layer, the plurality of layers of the second neural network having a same architecture as the plurality of layers of the first neural network except that the plurality of layers of the second neural network are connected in reverse order compared to the plurality of layers of the first neural network, such that the output layer of the first neural network corresponds to the input layer of the second neural network and the input layer of the first neural network corresponds to the output layer of the second neural network, the output layer of the second neural network outputting at least one second training output for each of the plurality of first training outputs;

determine an objective function depending on (i) at least one of the plurality of second training outputs, (ii) a respective first training input of the plurality of first training inputs that corresponds to the at least one of the plurality of second training outputs, and (iii) a predetermined modification magnitude; and train the first neural network using the objective function, the first neural network being trained to and configured to perform at least one of (i) a classification and (ii) a state determination based on sensor data received from a sensor, wherein the objective function includes at least a first term and a second term, the first term corresponding to a product of the at least one of the plurality of second training outputs multiplied by the respective first training input, the second term corresponding to a dual norm of a respective one of the plurality of first training outputs, corresponding to the respective first training input, weighted by the predetermined modification magnitude, and wherein at least one of the first term and the second term of the objective function is approximated using a random Cauchy projection, the random Cauchy projection being determined by passing a random Cauchy matrix through the second neural network.

2. The non-transitory computer readable medium of claim 1, wherein the dual norm is determined by estimating a median with the random Cauchy projection.

3. The non-transitory computer readable medium of claim 1, wherein the second term is approximated using the random Cauchy projection.

4. The non-transitory computer readable medium of claim 1, wherein at least one of the first neural network and the second neural network is a rectified linear unit (ReLu) network.

5. The non-transitory computer readable medium of claim 4, wherein the second neural network is a ReLu network, the second neural network generating the plurality of second training outputs according to a transformation function.

6. The non-transitory computer readable medium of claim 1, the non-transitory computer readable medium storing further program instructions that, when executed by the computer, cause the computer to:

determine a loss function which depends on the determined objective function, the plurality of second training outputs, and the plurality of first training inputs.

7. The non-transitory computer readable medium of claim 1, the non-transitory computer readable medium storing further program instructions that, when executed by the computer, cause the computer to:

determine a largest value for the predetermined modification magnitude for which the plurality of second training output corresponds to a target output value.

8. The non-transitory computer readable medium of claim 1, the non-transitory computer readable medium storing further program instructions that, when executed by the computer, cause the computer to:

compute a convex outer bound of an adversarial polytope based on the determined objective function.

9. A method for training an automated learning system, the method comprising:

processing a plurality of first training inputs with a first neural network of the automated learning system and outputting a plurality of first training outputs, the first neural network having a plurality of layers including an input layer and an output layer, the input layer receiving the plurality of first training inputs, the output layer outputting at least one first training output for each of the plurality of first training inputs;

processing the plurality of first training outputs with a second neural network of the automated learning system and outputting a plurality of second training outputs, the second neural network having a plurality of layers including an input layer and an output layer, the plurality of layers of the second neural network having a same architecture as the plurality of layers of the first neural network except that the plurality of layers of the second neural network are connected in reverse order compared to the plurality of layers of the first neural network, such that the output layer of the first neural network corresponds to the input layer of the second neural network and the input layer of the first neural network corresponds to the output layer of the second neural network, the output layer of the second neural network outputting at least one second training output for each of the plurality of first training outputs;

determining an objective function depending on (i) at least one of the plurality of second training outputs, (ii) a respective first training input of the plurality of first training inputs that corresponds to the at least one of the plurality of second training outputs, and (iii) a predetermined modification magnitude;

training the first neural network using the objective function, the first neural network being trained to and configured to perform at least one of (i) a classification and (ii) a state determination based on sensor data received from a sensor, wherein the objective function is determined using random Cauchy projections, the random Cauchy projections being propagated through the second neural network, wherein the objective function includes at least a first term and a second term, the first term corresponding to a product of the at least one of the plurality of second training outputs multiplied by the respective first training input, the second term corresponding to a dual norm of a respective one of the plurality of first training outputs, corresponding to the respective first training input, weighted by the predetermined modification magnitude, and wherein the first term and the second term are approximated using the random Cauchy projections.

10. The method of claim 9, further comprising:
computing a convex outer bound of an adversarial polytope based on the determined objective function.

11. The method of claim 9, further comprising:
determining a loss function which depends on the determined objective function and a respective second training output of the plurality of second training outputs that corresponds to the respective first training input.

12. The method of claim 9, further comprising:
determining a largest value for the predetermined modification magnitude for which the plurality of second training outputs correspond to a target output value.

* * * * *